:::

United States Patent
Vasanad et al.

(10) Patent No.: US 12,556,373 B2
(45) Date of Patent: Feb. 17, 2026

(54) TECHNIQUES FOR ESTABLISHING TRUST IN A CLUSTER OF EDGE DEVICES

(71) Applicant: Oracle International Corporation, Redwood Shores, CA (US)

(72) Inventors: Naren Shivashankar Vasanad, Fremont, CA (US); Suresh Sagiraju, San Jose, CA (US); Harshit Kumar Kalley, Sunnyvale, CA (US); Srikanth Vavilapalli, Dublin, CA (US); Gavin Chen, Redmond, WA (US); Denny Man Bun Yim, San Ramon, CA (US)

(73) Assignee: Oracle International Corporation, Redwood Shores, CA (US)

( * ) Notice: Subject to any disclaimer, the term of this patent is extended or adjusted under 35 U.S.C. 154(b) by 224 days.

(21) Appl. No.: 18/373,226

(22) Filed: Sep. 26, 2023

(65) Prior Publication Data

US 2025/0106006 A1    Mar. 27, 2025

(51) Int. Cl.
*H04L 9/08* (2006.01)
*H04L 9/14* (2006.01)

(52) U.S. Cl.
CPC ............. *H04L 9/0822* (2013.01); *H04L 9/14* (2013.01)

(58) Field of Classification Search
CPC ....... H04L 9/0822; H04L 9/14; H04L 9/0891; H04L 9/0894; H04L 9/3213; H04L 9/3247; H04L 63/062
See application file for complete search history.

(56) References Cited

U.S. PATENT DOCUMENTS

| | | | |
|---|---|---|---|
| 9,660,970 B1* | 5/2017 | Rubin | H04L 9/0891 |
| 2014/0222802 A1* | 8/2014 | Yan | G06Q 50/01 |
| | | | 707/723 |
| 2017/0104754 A1* | 4/2017 | Brickel | H04L 67/1097 |
| 2017/0222802 A1 | 8/2017 | Rubin et al. | |
| 2019/0190703 A1* | 6/2019 | Lekkas | H04L 9/0825 |
| 2019/0312851 A1 | 10/2019 | Campagna et al. | |
| 2021/0051137 A1 | 2/2021 | Ruiz | |
| 2022/0329578 A1 | 10/2022 | Becker et al. | |

OTHER PUBLICATIONS

International Application No. PCT/US2024/048196, International Search Report and Written Opinion mailed on Nov. 5, 2024, 13 pages.

* cited by examiner

*Primary Examiner* — Abiy Getachew
(74) *Attorney, Agent, or Firm* — Kilpatrick Townsend & Stockton LLP

(57) ABSTRACT

Techniques are disclosed to establish trust in a cluster of edge devices. An edge device cloud service can associate a first cloud-computing edge device with a fleet of cloud-computing edge devices and provision the first cloud-computing edge device with a master encryption key. The edge device cloud service can associate a second cloud-computing edge device with the fleet and provision the second cloud-computing edge device with the master encryption key and the first public encryption key. The first cloud-computing edge device can receive from the second cloud-computing edge device encrypted message data comprising the second public encryption key. The first cloud-computing edge device can decrypt the encrypted message data using the master encryption key stored in the first key store and update the first key store with the second public encryption key.

20 Claims, 15 Drawing Sheets

:::

TECHNIQUES FOR ESTABLISHING TRUST IN A CLUSTER OF EDGE DEVICES

BACKGROUND

In cloud computing, processing and storage is generally performed by one or more service providers implemented at a centralized location. Data can be received from customers at the centralized location, processed there, and then the processed (or other) data can be transmitted back to customers. However, having a centralized location for cloud infrastructure components may not be ideal in various scenarios. For example, when there are hundreds or thousands of Internet of Things (IoT) devices transmitting data to the central servers, and especially when those IoT devices are not geographically close to the cloud infrastructure computing devices, conventional centralized systems are not ideal. These IoT devices may be considered on the "edge," as in they are not close to the central servers.

Additionally, there may be other instances when the centralized location for cloud components is less than ideal. For example, if the data is collected (e.g., by IoT devices) in a disconnected region or a location with no Internet connectivity (e.g., remote locations). Current centralized cloud computing environments may not meet time sensitivity requirements when streaming data due to the inherent latency of their wide-area network connections. Remotely generated data may need to be processed more quickly (e.g., to detect anomalies) than conventional centralized cloud computing systems allow. Thus, there are challenges with managing a traditional cloud computing environment that relies on centralized components.

BRIEF SUMMARY

Embodiments of the present disclosure relate to establishing trust among several devices providing cloud computing or other distributed computing services at an "edge" location. In particular, a distributed computing system can include a "fleet" of edge devices that can be deployed as part of a cluster at the edge location and perform operations to provide cloud computing services without a connection to a cloud service provider (CSP) or other cloud services to perform configuration and management of the devices once deployed. As used herein, the term "fleet" may refer to a logical abstraction of the collection of edge devices that are part of the same cluster, while the terms "edge devices," "edge computing devices," and "cloud-computing edge devices" can refer to various edge devices described herein. The CSP may be responsible for configuring the edge devices prior to delivery a customer location, but the edge devices may be deployed to a customer location that does not have a public network connection or a restricted network connection that prevents communication to the CSP after deployment. Because additional edge devices may be provisioned and deployed to the fleet, the existing edge devices may need a way to determine if the additional edge devices can be trusted when establishing secure communication channels between them in the cluster.

One embodiment is directed to a method performed by a distributed computing system that includes a plurality of cloud-computing edge devices that can be configured by an edge device cloud service and then subsequently operate in a distributed computing cluster not in communication with the edge device cloud service. The method can include the edge device cloud service associating a first cloud-computing edge device with a fleet of cloud-computing edge devices. Associating the first cloud-computing edge device with the fleet can include obtaining a first public encryption key of the first cloud-computing edge device. The fleet can be characterized by a master encryption key and public encryption keys obtained from the cloud-computing edge devices in the fleet. The edge device cloud service can maintain the master encryption key and public encryption keys in a datastore. The method can also include the edge device cloud service provisioning the first cloud-computing edge device with the master encryption key. The first cloud-computing edge device can store the master encryption key in a first key store. The method can also include the edge device cloud service associating a second cloud-computing edge device with the fleet. The edge device cloud service can obtain a second public encryption key of the second cloud-computing edge device and then provision the second cloud-computing edge device with the master encryption key and the first public encryption key. The second cloud-computing edge device can store the master encryption key and the first public encryption key in a second key store. The method also includes receiving, by the first cloud-computing edge device from the second cloud-computing edge device, encrypted message data that includes the second public encryption key. The encrypted message data can be generated by the second cloud-computing edge device using the master encryption key. The first cloud-computing edge device can decrypt the encrypted message data using the master encryption key stored in the first key store and update the first key store with the second public encryption key.

Another embodiment is directed to a distributed computing system configured with one or more processors and one or more memories storing computer-executable instructions that, when executed by the one or more processors, cause the computing cluster to perform the method described in the preceding paragraphs.

Still another embodiment is directed to a non-transitory computer-readable medium storing computer-executable instructions that, when executed by one or more processors of a computing cluster, cause the computing cluster to perform the methods disclosed herein.

DETAILED DESCRIPTION

Introduction

Figure 1:
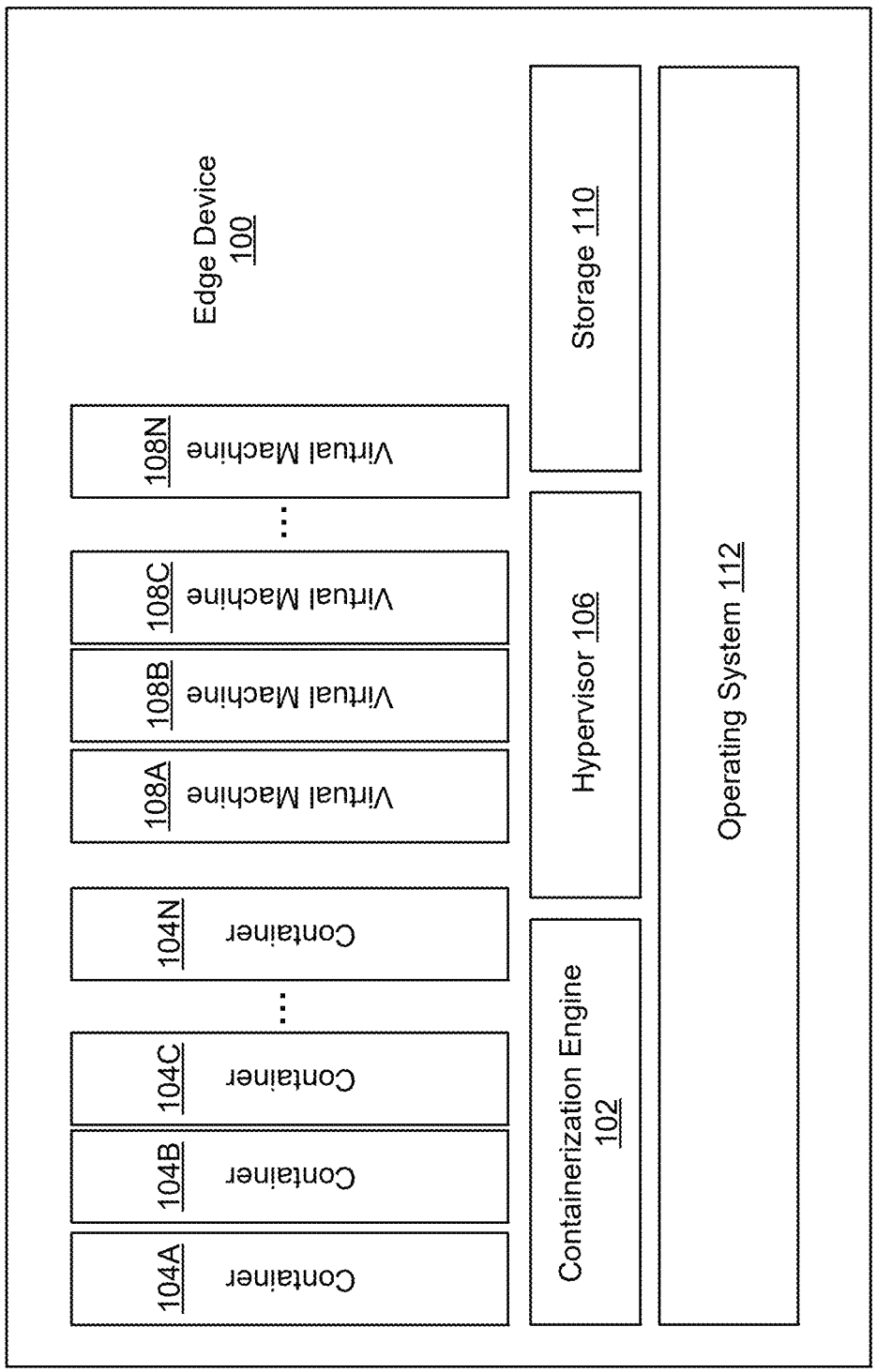
FIG. 1 is a block diagram of an example high-level architecture for a cloud infrastructure edge computing device, according to at least one embodiment, according to some embodiments.

In some examples, a cloud-integrated edge service (e.g., implemented in an edge computing device) may be integral in addressing the desire to run time-sensitive cloud infrastructure application outside of a centralized data center (e.g., a datacenter of a cloud infrastructure service provider). Such an edge computing device may deliver computing and storage at the edge and/or in disconnected locations (e.g., remote locations separate from the centralized data center and lacking a public/private network connection (e.g., an Internet connection, a VPN connection, a dedicated connection, etc.) to enable low-latency processing at or near the point of data generation and ingestion. In some instances, a fleet of portable (which may be ruggedized for protection) server nodes (e.g., a fleet of edge devices) may be configured to physically bring the cloud infrastructure service to remote locations where cloud technology has been considered technologically infeasible or too cost prohibitive to implement.

To a customer (e.g., a user), the edge computing device can act as an extension of their cloud infrastructure: including virtual machines (VMs), containers, functions and data files, block volumes or object store services can also be delivered from the cloud infrastructure tenancy (e.g., a tenancy of the centralized cloud computing environment) with little to no modifications, and the customer experience may remain unchanged from that of the centralized cloud computing experience. Additionally, the edge computing device may be configured to implement both a control plane and a data plane that are part of a cloud infrastructure service provider. The data plane can be configured to manage data storage, migration, processing, etc., while the control plan can be configured for controlling the various services and architecture components of the computing device. Once the edge computing device is properly connected to a customer computing device (e.g., via a local area network (LAN)), the customer may be able to utilize the IaaS service (or at least a subset of it) using the same SDK and API used with the centralized cloud service.

The edge computing device can be delivered to a customer in a pre-configured form, such that the only action that might be required of the customer is to connect the nodes to a network (e.g., a local/on premise network that is accessible by a user computing device), power them up, and/or log in. The device can be pre-configured in various ways based on customer preference/request, or it can be in one of various configurations (e.g., storage-centric, compute-centric, etc.). The node or cluster of nodes can be portable and is intended to be mobile-when moved and set up again (or used while in motion), the deployment continues to run from where it turned off (or continuously). The edge computing device can also monitor for wide area network (WAN) connection availability (e.g., the Internet or the like), and can synchronize customer and management data with the cloud once connected to a WAN.

Some potential use cases for the edge computing device include: storage and processing, compute and input/output (I/O) intensive applications, machine learning, remote computing, low latency database and analytics, and data collection and migration. More specifically, the edge device can be used for storage and processing of large volumes of images, video, audio, and IoT sensor data generated in environments where WAN connection is latent or unavailable (e.g., in remote areas, an oil off-shore platform, or the like). Once this data is pre-processed, filtered, compressed, and/or secured it may be transported or transferred to the cloud service provider, where it can be further processed by the centralized server (e.g., traditional cloud service provider). The device can also be used for compute and I/O intensive applications, where low latency is paramount, such as tactical reconnaissance or 5G communications. The device can also be used for machine learning, with models trained in the cloud and running in disconnected locations to improve efficiency, intelligence, and/or productivity in manufacturing, document management, transportation, oil and gas mining, and/or telecommunications. It can also be used for remote computing requiring elevated security and airtight containment of data. Additionally, the device can be used for low latency database and analytics workloads, with more applications optimized over time. Further, the device can also be used for data collection and migration of large sets of object and database management system (DBMS) data into a cloud service provider, e.g., at faster speeds and lower cost than a WAN transfer.

The edge device can natively support distributed cloud paradigms, where complex, multi-stage compute workflows can be separated into individual components, which in turn can be deployed to the infrastructure of the edge device, on premise, and/or in the cloud. An example of such distributed workflow is represented in the following scenario. Massive amounts of data can be collected by an edge computing node deployed on an airplane (e.g., a military jet) in a reconnaissance operation with no Internet access (e.g., a disconnected edge computing device), where this data is be pre-processed in near real time by a machine learning model previously trained by the cloud service provider that provided the edge device. Even the first pass of processing the data with the models can detect significant anomalies and can alert personnel immediately—for example, a bridge may be destroyed and therefore the troops should be rerouted. When the airplane lands, the edge computing device can be physically connected to a network (e.g., an edge station potentially deployed at the airstrip). The pre-processed, filtered, smaller dataset can be loaded for final processing to a cluster of edge computing device nodes at the edge station. The original edge computing device can be released and can be loaded on another (or the same) airplane, for example to support the next mission. When processing at the edge station is complete, a 3D map update can be issued for immediate use. Change sets can then be uploaded by the edge station cluster to a datacenter and can be used to build future models providing intelligent tactical forecasts to the reconnaissance operation, or the like.

It should be appreciated that the following techniques may be employed in a variety of contexts such as telecommunications, oil and gas, healthcare, hospitality, agriculture, transportation, and logistics, and the like.

Embodiments described herein address these and other problems, individually and collectively. Specifically, embodiments of the present disclosure provide for a cloud infrastructure edge computing device.

Edge Device Architecture

An edge computing device (sometimes referred to as "a cloud edge device" or an "edge device," for brevity), extends a user's centralized cloud computing tenancy by physically putting customer infrastructure and platform services where data is generated—on the edge, on premise, or completely disconnected. Each deployment is created to address specific customer needs by provisioning VM instance images and data from the customer's centralized cloud tenancy. These workloads remain fully functional offline as the edge device adapts to the connection state, operates in harsh environmental conditions, and is ready to sync with the cloud whenever the connection is re-established.

FIG. 1 is a block diagram of an example high-level architecture for a cloud infrastructure edge computing device (e.g., edge device 100), according to at least one embodiment. An overview of the software and hardware component of the edge device 100 is provided below.

In some examples, the edge device 100 may include containerization engine 102 (e.g., Docker, Kubernetes, etc.) configured to implement one or more containers (e.g., corresponding to service(s) 104A, 104B, 104C, to 104N, collectively referred to as "service(s) 104"). A containerization engine (e.g., the containerization engine 102) may be container-orchestration system for automating computer application deployment, scaling, and management. In some embodiments, the containerization engine may be configured to provide OS-level virtualization to deliver software in packages called containers. These containers can be isolated from one another and utilize respective software, libraries, and configuration files, and can communicate with each other through well-defined channels. In some embodiments, service(s) 104 may include any suitable number of services (e.g., one or more). These services may implement at least some portion of centralized cloud capabilities. Each service may be stand-alone or operate as a distributed cluster. The edge device 100 may further include a hypervisor 106 configured to implement one or more virtual machines (e.g., virtual machines 108A, 108B, 108C, to 108N, collectively referred to as "virtual machine(s) 108" or "VMs 108").

In some examples, the edge device 100 includes storage 110 (e.g., object and/or block storage for storing local data). The edge device 100 includes operating system (OS) 112. In some embodiments, the OS 112 may be optimized for executing on an edge device and/or specific to execution on an edge device. OS 112 may be configured to manage the hardware of edge device 100 and supports a data plane of the services running on the edge device 100. The OS 112 may be configured to support a specific deployment type (e.g., a single edge device deployment, or a specific edge device cluster configuration). The OS 112 may be configured to secure the edge device by disallowing direct access by customers.

In some embodiments, the edge device 100 may include hardware such as any suitable number of central processing units (CPUs) and/or storage drives. For example, the edge device 100 depicted in FIG. 1 may have one, two, or more CPUs, with various numbers of cores per processing unit, and it may include any number of storage drives (e.g., 6.4 terabyte (TB) drives, or the like). As a non-limiting example, the edge device 100 may include block and/or object storage of any suitable size. The edge device 100 may include any suitable number of central processing units (CPUs), graphics processing units (GPUs), random access memory (RAM) of any suitable size, one or more ports (e.g., QSFP28, RJ45, dual ports, etc.), tamper-evident seals, or any suitable combination of the above components.

In some examples, the basic system functionality/services can be accessed via RESTful APIs have a custom load of software based on Linux. The virtual machine(s) 108 may individually be a Kernel-based Virtual Machines (KVM) and/or a hardware-based Virtual Machine (QEMU). Although storage 110 is represented as a separate component from the container(s) 104 and VM(s) 108, it can run as a container (e.g., container 104A) or in a VM (e.g., VM 108A). In some examples, it may be favorable to implement the storage 110 (e.g., object storage, block storage, etc.) as a container.

Figure 2:
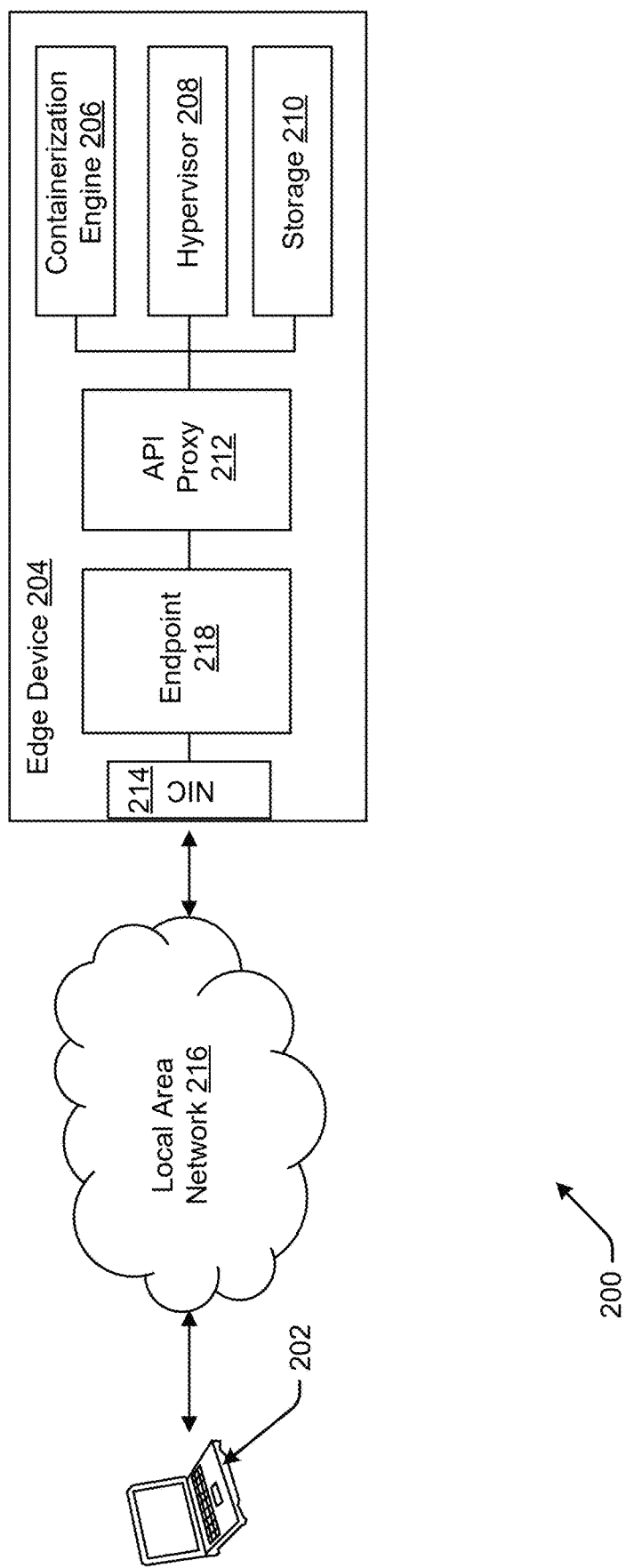
FIG. 2 is a block diagram of an example architecture for connecting a user computing device to a cloud infrastructure edge computing device, according to at least one embodiment, according to some embodiments.

FIG. 2 depicts an example architecture 200 for connecting the edge device described herein (e.g., edge device 100 from FIG. 1) to a computing device 202 (e.g., a user computing device). The computing device 202 can be any type of computing device including, but not limited to, a laptop computer, a desktop computer, or the like. The edge device 204 (an example of the edge device 100 of FIG. 1) may include containerization engine 206 (an example of the containerization engine 102 of FIG. 1), hypervisor 208 (an example of the hypervisor 106 of 1), and storage 210 (an example of the storage 110 of 1).

Additionally, as mentioned briefly above, the edge device 100 may include an API proxy 212 for managing the RESTful API calls received from the computing device 202. The API calls may enter the edge device 204 via network interface card (NIC) 214 that is internal to the edge device 204. The network interface card 214 may be used to connect the edge device 204 to the computing device 202 via a local area network (e.g., the LAN 216). The API calls received by the NIC 214 may be transmitted to an exposed endpoint that may implement a Web server (e.g., endpoint 218). The web server can transmit the requests to the API Proxy 212, which can route the requests to the appropriate service (e.g., containerization engine 206, hypervisor 208, and/or storage 210). The exposed endpoint/web server may also be configured to implement the lightweight console that is for use by the customer (e.g., the user interface displayed on the computing device 202).

The lightweight console can run within a web browser (e.g., Mozilla Firefox, or the like) on a laptop computer, desktop computer, or other network-accessible device (e.g., connected to the local area network (LAN 216)) that is network-connected to the edge device 204 (e.g., via a router, cable, etc.). The edge device 204 can expose the endpoint 218 for the console connection, and the web server can transmit data to the web browser of the computing device 202 over the LAN 216.

Figure 3:
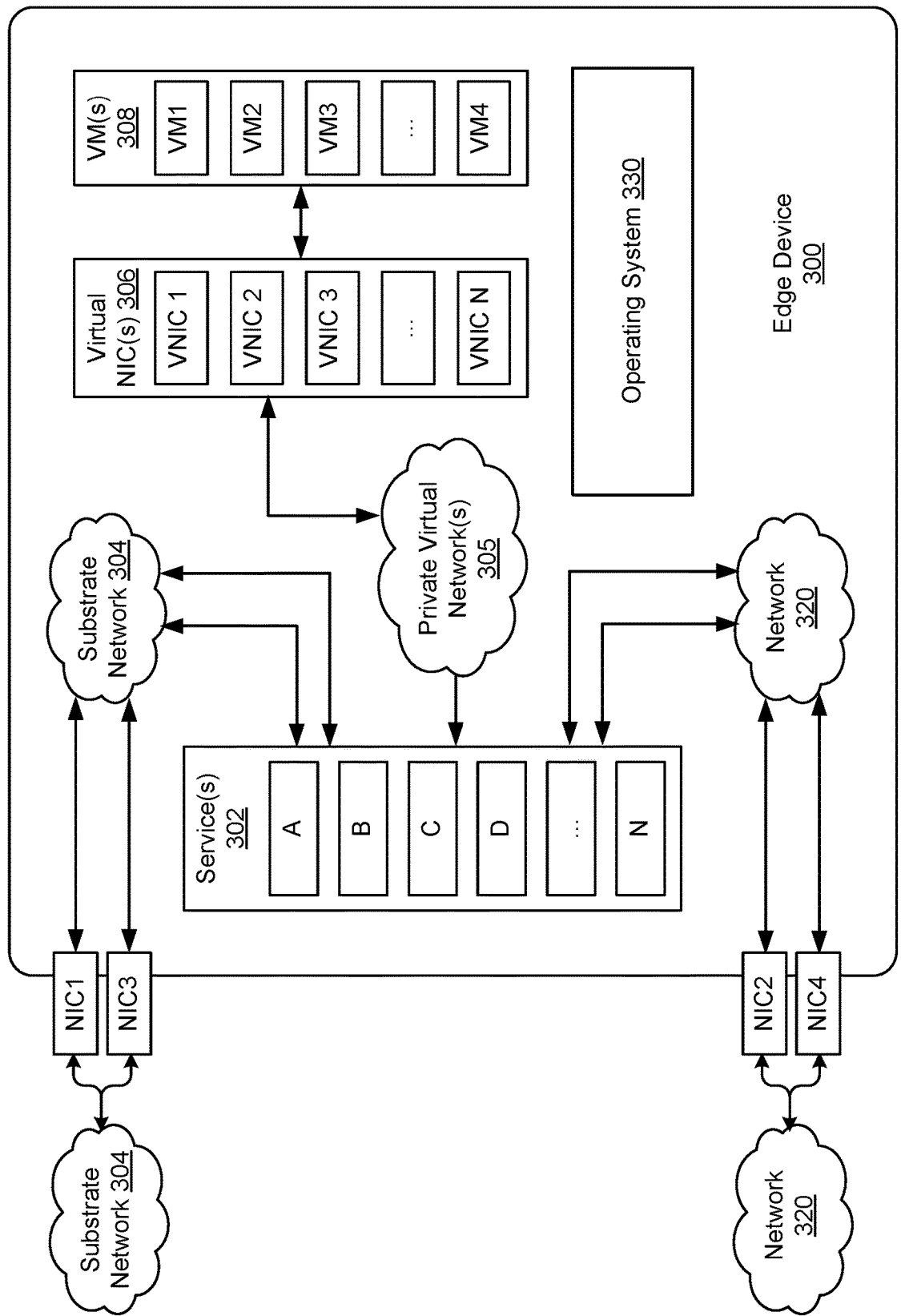
FIG. 3 is a block diagram of an example computer architecture of a cloud infrastructure edge computing device, according to at least one embodiment, according to some embodiments.

FIG. 3 is a block diagram of an example computer architecture of a cloud infrastructure edge computing device (e.g., edge device 300, an example of the edge devices 100 and 204, of FIGS. 1 and 2, respectively), according to at least one embodiment. The edge device 300 can be thought of as a cloud-integrated service that extends some or all of conventional cloud capabilities to locations outside of cloud data centers. This can be achieved via portable ruggedized server nodes that provide cloud-like functionality in locations with no WAN connectivity. This allows customers to shift select cloud workloads to remote locations and enable intensive data processing operations close to the data ingestion points at the edge of their cloud infrastructure.

The edge device 300 may include any suitable number of services (e.g., service(s) 302). Each service may run as a container (e.g., a Docker container) locally on the edge device 300. The service(s) 302 may be communicatively connected via a substrate network 304 such that the communications between services are encrypted (e.g., in accordance with a security protocol such as MACsec). Each container may be assigned a substrate IP address (e.g., a static address) with which traffic can be addressed. In some embodiments, a security protocol (e.g., MACsec) is configured at provisioning time (e.g., before the edge device 300 is shipped to the user). The edge device's system software (including service(s) 302) may execute in the secure environments protected by boot security software (e.g., Trenchboot Secure Launch). Users may be restricted from accessing the secure environment and/or the substrate network 304. To minimize the amount of resources used by these services the service code may be compiled and saved to disk to decrease RAM space as well as decrease the CPU load on the edge device 300.

Some example services included in service(s) 302 may include a UI console service, an identity control plane (CP) service, an identity data plane (DP) service, a compute application programming interface (API) service, a compute worker thread service, a virtual network (VN) API service, a block storage API service, a function-as-a-service service, an events service, an object storage management service (e.g., implementing a storage platform such as Ceph Storage (a product of Red Hat, Inc.)), a compute DP service (e.g., an example of hypervisor 208 of FIG. 2), a VN DP service, a block storage management service, a function-as-a-service API service, a function-as-a-service load balancing (LB) service, a function-as-a-service process thread service, a distributed data store management service (e.g., etcd3), a dynamic host configuration protocol service, a domain name system service, a network time protocol (NTP) service, to name a few. Some example functionality provided by these services is discussed below.

By way of example, compute DP service may be configured (e.g., preconfigured and provisioned onto the edge device 300) to isolate the VM(s) 308 on the same hypervisor host. The compute DP service can utilize any suitable container engine (e.g., Docker container, MicroContainer, or the like) to isolate the VM(s) 308 on the same hypervisor host from each other. The compute DP service may utilize any suitable hypervisor (e.g., Quick EMUlator (QEMU), Kernel-based Virtual Machine (KVM), etc.) to provide virtual hardware emulation for VM(s) 308. In some embodiments, VNIC(s) 306 are attached to subnets of any suitable number of virtual networks (e.g., private virtual network(s) (PVN(s))) 305 and are assigned private Internet Protocol (IP) addresses. One VM may have multiple VNICs from different VCNs and different subnets. The maximum number of VNICs can be limited by predefined thresholds (e.g., configuration data referred to as "VM shape" that defines VNICs per VM count, VNIC shape, etc.). In some embodiments, the predefined thresholds are applied to each of the VM(s) 308. The subnets utilized by the VNIC(s) 306 may be isolated by VLANs. In some embodiments, some or all of the VNIC(s) 306 may be assigned public and/or private IP addresses. A public IP address is an address in the network(s) 320, while a private IP address refers to an IP address of the PVN(s) 305.

In some embodiments, the edge device 300 implements various networking functionality via a number of services such as a network address translation (NAT) service, a dynamic host configuration protocol (DHCP) service, a domain name system (DNS) service, a network time protocol (NTP) service, a metadata service, and a public API service). The metadata service may provide initialization data and other metadata to all VM(s) 308. In some embodiments, DHCP service assigns private IP addresses to each of the VNIC(s) 306, each of the VM(s) 308 having one or more VNICS. DNS service may provide domain name resolution to VM(s) 308 on the edge device 300. NTP may provide time synchronization to VM(s) 308. In some embodiments, a public IP service executing as part of service(s) 302 may enable a VM to access a public API without assigning the VM a public IP and without configuring a service gateway.

In some embodiments, at least one of the VM(s) 308 may implement block (or object) storage. In some embodiments, the hypervisor associated with a virtual machine may include a library that enables the hypervisor to use a distributed data storage platform (e.g., Ceph). The library may utilize a protocol associated with that storage platform (e.g., RADOS Block Device (RBD)) to facilitate storage of block-based data. The distributed data storage platform may be implemented over multiple virtual machines. In some embodiments, the distributed data storage platform supports making snapshots and copying block volumes. VM images and VM block volumes can be Ceph block devices. In some embodiments, the VM(s) implementing the distributed data storage platform will use system reserved resources (e.g., 8 CPU cores, some of the total number of CPUs available on the edge device 300). For example, in order to provision a boot volume, a block device image may be copied to a boot volume of the block device. The distributed data storage platform may use block devices include multiple nodes for redundancy. If some node fails then the block device can continue to operate. In some embodiments, the distributed data storage platform (e.g., Ceph), automatically recovers the block device data in case of a few node failures. Block storage may be utilized to store images for any suitable deployable resource. By way of example, an image may be utilized for launching VMs. In some embodiments, the image may correspond to a particular VM shape (e.g., a compute heavy VM, a GPU optimized VM, a storage VM, and the like).

Compute API service may support the following operations: 1) VM launch and terminate, 2) VM stop, start, reboot, 3) List VMs and/or get information on a specific VM, 4) obtain VM console history API, 5) obtain a VM snapshot, 6) attach/detach block volumes, and the like. In some embodiments, Compute API service can be used to call other services (e.g., compute DP service, identity DP service for authentication and authorization, etc.).

Some of the functionality of other services will be discussed in connection with FIG. 7. In general, although each service may not be discussed in detail herein, the general functionality provided by the service(s) 302 may include the functionality of cloud services provided by a remote cloud service provider. In some embodiments, the edge device 300 may be associated with a predefined region and/or realm such that some of the service(s) 302 may operate as if they were operating in a cloud computing environment, despite the fact they are operating on one or more local device(s) (one or more edge devices) as a single instance or as part of a distributed service that may have no or intermittent public network access to a cloud computing environment associated with the customer.

In some embodiments, the edge device 300 may provide any suitable number of virtual networks (e.g., private virtual network(s) 305) using compute, memory, and networking resources (e.g., virtual network interface card(s) (VNIC(s) 306)). A virtual network is a logical network that runs on top of a physical substrate network. Using the service(s) 302, one or more customer resources or workloads, such as virtual machines (e.g., virtual machine(s) (VM(s)) 308, executing a compute instance) can be deployed on these private virtual networks. Any suitable combination of VM(s) 308 can execute functionality (e.g., a compute instance, storage, etc.) which is individually accessible through a virtual NIC (e.g., one of the virtual NIC(s) 306). Each VM that is part of a PVN is associated with a VNIC that enables the VM (e.g., a compute instance) to become a member of a subnet of the PVN. The VNIC associated with a VM facilitates the communication of packets or frames to and from the VM. A VNIC can be associated with a VM when the VM is created. PVN(s) 305 can take on many forms, including peer-to-peer networks, IP networks, and others. In some embodiments, substrate network traffic of the service(s) 302 may be encrypted and/or isolated (e.g., by virtue of different PVNs or subnets) from network traffic of one or more the VM(s) 308 executing on the edge device 300.

The edge device 300 thus provides infrastructure and a set of complementary services that enable customers to build and run a wide range of applications (e.g., compute instances), services, and/or storage in a highly available, physically local, and virtual hosted environment. The customer does not manage or control the underlying physical resources provided by the edge device 300 but has control over expanding or reducing virtual machines (e.g., compute instances, virtual NICs, block or object storage, etc.), deploying applications to those virtual machines, and the like. All workloads on the edge device 300 may be split into different CPU sets (e.g., VM and non-VM). One set (e.g., non-VM such as workloads performed by the service(s) 302) may utilize a subset of CPU cores (e.g., 8) of the edge device 300, while the other set (e.g., VM workloads performed by the VM(s) 308) may utilize a different subset of CPU cores.

The edge device 300 may be communicatively connected to a user device (e.g., the computing device 202 of FIG. 2) via one or more network interfaces (e.g., NIC2 and/or NIC 4) and network 320 to interact and/or manage the VM(s) 308. In certain embodiments, a lightweight console can be provided at the user device via a web-based user interface that can be used to access and manage the edge device 300. In some implementations, the console is a web-based application (e.g., one of the service(s) 302) provided by the edge device 300.

FIG. 3 depicts a single edge device. However, it should be appreciated that more than one edge device may be utilized as a distributed computing cluster.

Figure 4:
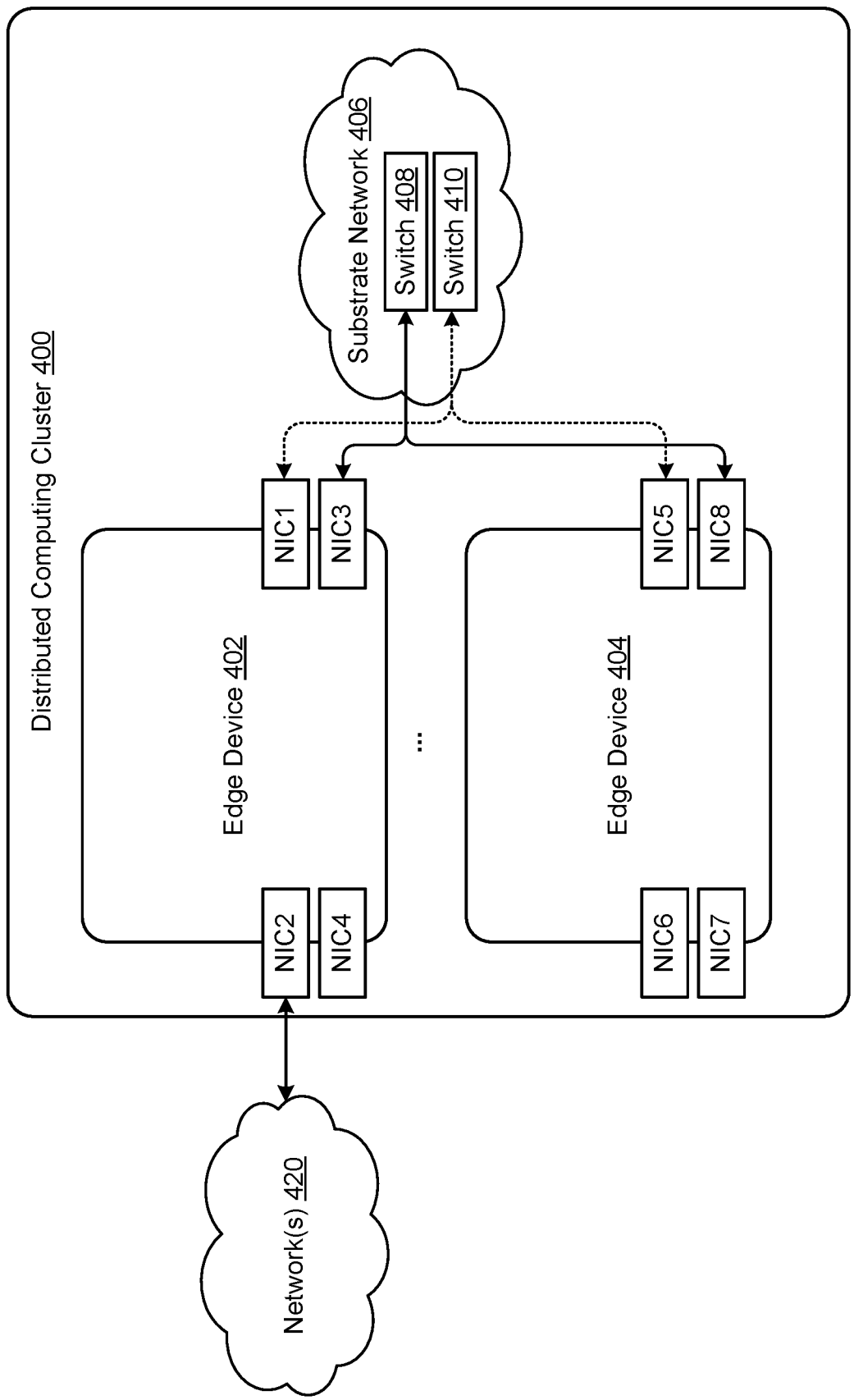
FIG. 4 is a block diagram depicting a distributed computing cluster that includes one or more edge computing devices, according to at least one embodiment, according to some embodiments.

FIG. 4 is a block diagram depicting a distributed computing cluster 400 that includes one or more edge computing devices (e.g., edge device 402 and 404, each an example of the edge device 300 of FIG. 3), according to at least one embodiment.

Each edge device of the distributed computing cluster 400 may be connected via substrate network 406 (an example of the substrate network 304 of FIG. 3. In some embodiments, the edge devices of the distributed computing cluster 400 (sometimes referred to as "edge computing nodes" or "edge nodes") may be connected by the substrate network 406 using one or more switches (e.g., switch 408 and/or 410). In some embodiments, NIC1 and NIC5 may include a particular connector (e.g., RJ45 connector) while NIC3 and NIC8 may include the same or a different connector (e.g., a QSFP28 100 GbE connector). In some embodiments, only one edge device of the distributed computing cluster 400 is connected to a customer network such as network(s) 420 (an example of the network(s) 320 of FIG. 3). Thus, not only may traffic between services of an edge device be encrypted and isolated from other traffic of a given edge device, but traffic between distributed services operating across multiple edge devices may also be encrypted and isolated from other traffic of the computing cluster. In some embodiments, each edge device is preconfigured as a particular node in the distributed computing cluster 400. In other embodiments, the user can configured the number and topology of the edge devices of the distributed computing cluster 400.

Trust Establishment Between Edge Devices in a Fleet

As discussed briefly above, the edge devices may be deployed as clusters in a variety of locations with limited or no network connection to a public network or other network allowing access to cloud services. In some examples, the lack of external network connectivity may be due to security restrictions (e.g., a secured private network) that prevent connections to the cloud. For clusters of edge devices configured by a CSP, the lack of reliable network connectivity to the CSP can limit the provisioning and configuration of the edge devices once deployed or the provisioning and deployment of new edge devices to an existing cluster. In particular, edge devices in an existing cluster may require a mechanism to establish trust (e.g., provide authentication and authorization) for new edge devices added to the cluster. If external network connections to a CSP or other cloud-based services (e.g., certificate authorities, etc.) are unavailable, then the existing edge devices in the cluster may not have the required chain of trust to establish secure network communications in the cluster with the newly added edge devices.

To establish trust among edge devices without a network connection to the CSP, the CSP or customer of the CSP can manage the cluster of edge devices as a fleet of associated edge devices. The CSP can configure each edge device in each fleet with suitable information (e.g., credentials, encryption keys, certificates, etc.) that allow the edge devices to verify one another in the cluster without communicating with the CSP or other services external to the cluster (or external to the secured private network in which the cluster operates, e.g., a secure network of a customer of the CSP). The CSP may implement an edge device cloud service to provide the management of the edge device fleets, including operations for configuring and provisioning edge devices prior to deployment of the edge devices to a destination site (e.g., a customer facility, secure facility, remote location, etc.).

Each edge device can be associated with a fleet configured by the CSP. The fleet can define the association of the edge devices that later operate as a cluster of edge devices. For example, each fleet of edge devices can correspond to a cluster of edge devices that are deployed to a destination site. In some examples, one or more fleets may be associated with clusters operated by one customer of the CSP. Each fleet can be associated with a fleet master encryption key that can be configured onto each device associated with the fleet and used to encrypt/decrypt messages used to authenticate and/or authorize each edge device within the cluster. Because this fleet master encryption key can be a shared key, symmetric encryption methods can be used within the cluster of edge devices to establish the trust between the edge devices.

The techniques described herein provide numerous advantages over typical methods of deploying clusters of computing devices at remote locations. For example, managing edge devices as part of a fleet can allow for secure integration of new edge devices into a cluster without connection to the cloud over a public or other network, thereby maintaining a suitable security posture for secured networks of the cluster and allowing the edge devices to verify the authenticity of an added device without relying on an external service. As another example, pre-configuring the edge devices with sufficient information to perform authentication and authorization of the edge devices reduces manual configuration operations of the devices on site, which in turn can reduce the number of operations necessary to integrate the devices into an existing cluster and ensure that the existing cluster can provide cloud services during the addition of the new devices.

Figure 5:
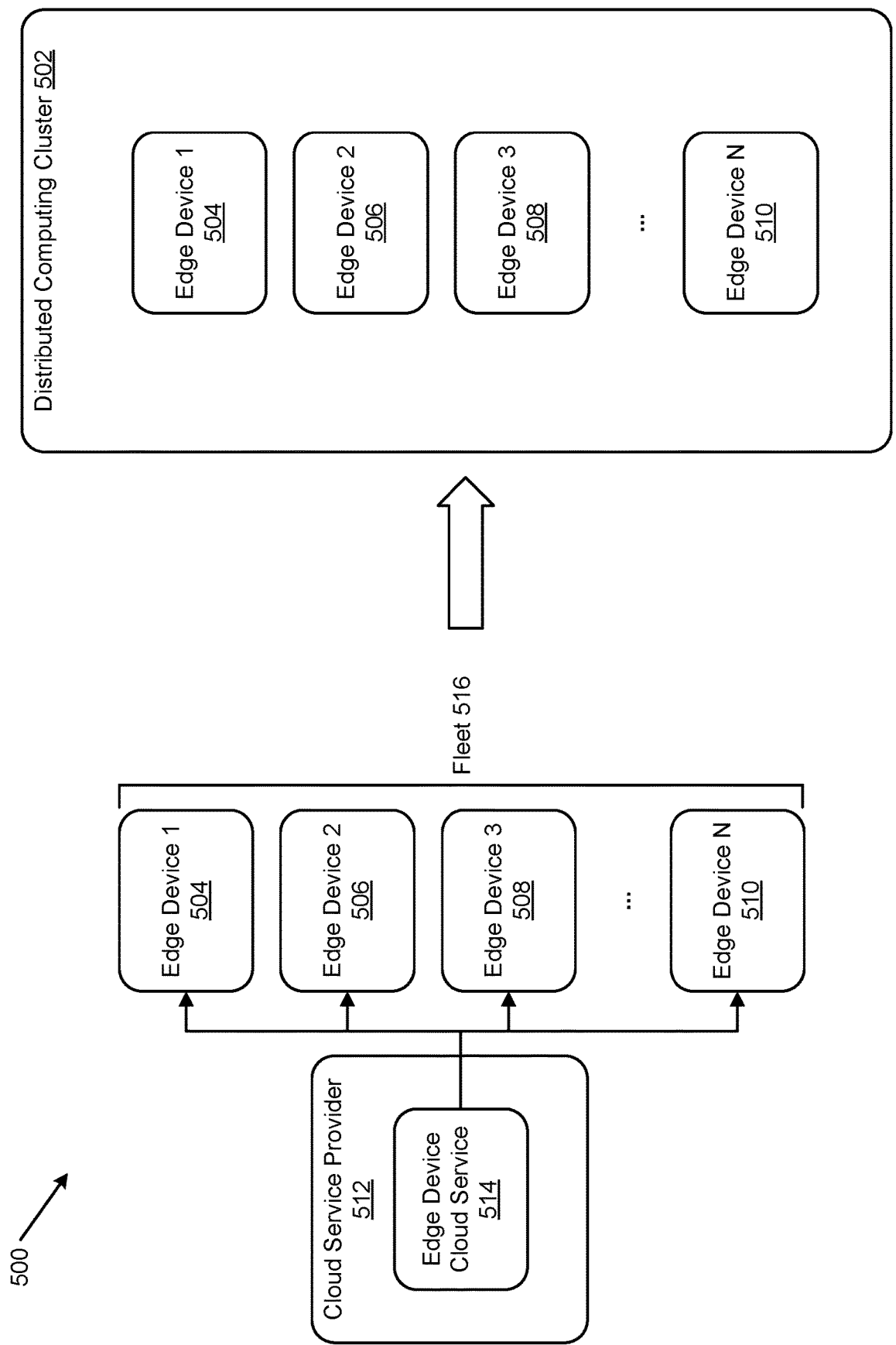
FIG. 5 is a block diagram depicting a distributed computing system that includes a distributed computing cluster of one or more edge devices that are managed by a CSP as part of a fleet, according to some embodiments.

FIG. 5 is a block diagram depicting a distributed computing system 500 that includes a distributed computing cluster 502 of one or more edge devices that are managed by a CSP 512 as part of a fleet 516, according to some embodiments. The distributed computing cluster 502 may be similar to distributed computing cluster 400 of FIG. 4, while edge devices 504-510 may be examples of edge device 300 of FIG. 5, according to at least one embodiment. The distributed computing cluster 502 can include one or more edge devices, including edge device 1 504, edge device 2 506, edge device 3 508, and up to edge device N 510. The edge devices 504-510 may be connected together via a substrate network within the distributed computing cluster 502, as well as to additional networks (e.g., network(s) 420 of FIG. 4). For example, the distributed computing cluster 502 may be installed at a secure customer facility and connected to a customer network.

The CSP 512 can provide configuration, provisioning, and management of the edge devices 504-510 prior to deploying the edge devices 504-510 to a destination site. The CSP 512 may provide an edge device cloud service 514 that is configured to perform operations to configure the edge devices 504-510. For example, the edge device cloud service 514 can provision encryption keys, certificates, identifiers, and other information onto the edge devices 504-510. The configuration operations can be performed on the edge devices 504-510 prior to the edge devices 504-510 being shipped or delivered to a destination site. The configuration operations can also include associating the edge devices 504-510 with a fleet 516. The fleet 516 may be a logical abstraction of the edge device 504-510 associated within a distributed computing cluster. In some embodiments, fleet 516 can represent more than one cluster of edge devices. The edge device cloud service 514 may also be configured to maintain configuration information associated with the fleet 516. For example, the edge device cloud service 514 can maintain fleet encryption keys and public keys for the edge devices in a fleet for use in other configuration operations for edge devices associated with the fleet (e.g., configuring a new edge device for an existing fleet).

The distributed computing cluster 502 may operate at a customer site, remote location, or other site that lacks a network connection to the CSP 512. For example, the distributed computing cluster 502 may operate in a remote facility (e.g., an oil rig facility) that does not have network access to the public internet. In another example, the distributed computing cluster 502 may operate in a secure network (e.g., a government or defense facility that operates a restricted or otherwise secure network) for which network connections to external resources can be restricted or forbidden. Thus, configuring the edge devices 504-510 by the edge device cloud service 514 may only be possible prior to the deployment of the edge devices 504-510 to the site hosting the distributed computing cluster 502.

Figure 6:
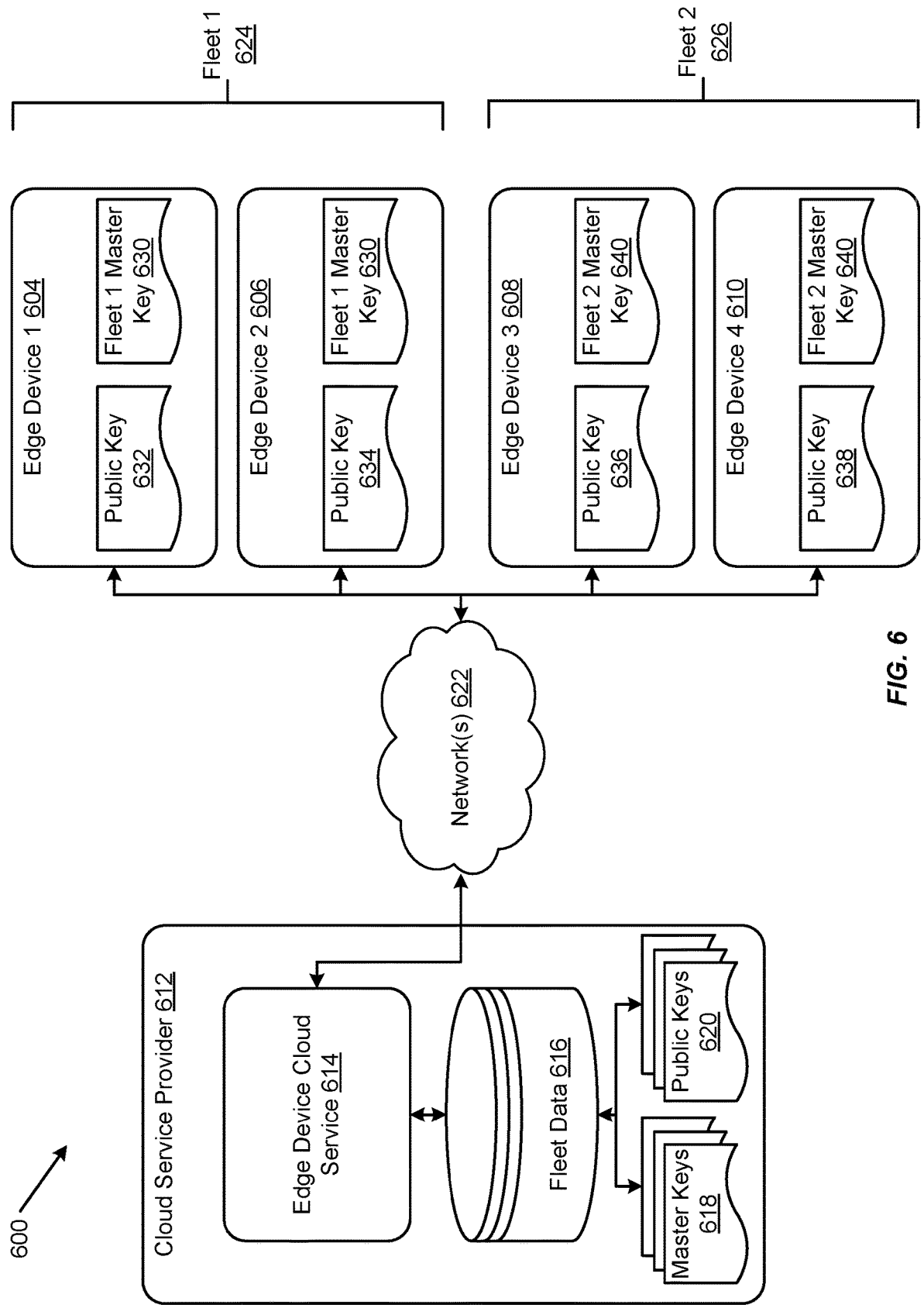
FIG. 6 is a block diagram depicting provisioning fleets of edge devices by a CSP, according to some embodiments.

FIG. 6 is a block diagram depicting provisioning fleets of edge devices by a CSP 612 in a distributed computing system 600, according to some embodiments. The CSP 612 may be an example of CSP 512 described above with respect to FIG. 5, while edge device cloud service 614 may be an example of edge device cloud service 514 of FIG. 5. The edge devices 604-610 may each be an example of edge devices described herein, including edge device 300 of FIG. 3.

During provisioning of edge devices as part of fleets, the edge devices can be connected to edge device cloud service 614 over one or more network(s) 622. The network(s) 622 may be any suitable network including public networks (e.g., the Internet), private networks, cellular networks, a local area network, or any other such network or combination thereof. Components used for such a system can depend at least in part upon the type of network and/or environment selected. Protocols and components for communicating via such a network are well known and will not be discussed herein in detail. Communication over the network(s) 622 can be enabled by wired or wireless connections and combinations thereof.

Configuring the edge devices 604-610 can occur with the edge devices 604-610 in the physical custody of the CSP 612 and/or at a facility associated with the CSP 612 and permitting connections over the network(s) 622. For example, the CSP 612 may use a facility to perform configuration and deploy software to the edge devices prior to delivery to a customer. Once a fleet has been configured, the associated edge devices can be shipped to a destination site (e.g., customer facility). Once shipped to the destination site, the edge devices may no longer be able to connect to the edge device cloud service 614 for further configuration operations.

Configuring the edge devices can include associating edge devices with fleets. In the example depicted in FIG. 6, edge device 1 604 and edge device 2 606 can be associated with fleet 1 624, while edge device 3 608 and edge device 4 610 can be associated with fleet 2 626. In some embodiments, fleet 1 624 and fleet 2 626 can include more than two edge devices. The number of edge devices in a fleet may not be fixed. For example, additional edge devices can be associated with the fleets at a future time, to support the expansion of the capabilities (e.g., compute, storage, etc.) of a distributed computing cluster of edge devices. Similarly, a deployed edge device associated with a fleet may fail or otherwise need to be replaced. The replacement edge device can be configured by edge device cloud service 614 prior to shipment to the destination site.

The edge device cloud service 614 can configure each edge device with a master encryption key associated with each fleet. For example, edge device 1 604 and edge device 2 606 can be provisioned with fleet 1 master key 630. The master encryption key can be any suitable secret key for use in symmetric key methods, including advanced encryption standard (AES) 128 bit keys, AES 256 bit keys, and the like. Each edge device may include a key store for storing keys and other secrets. The key store may be a trusted platform module (TPM), hardware security module (HSM), or similar component for managing keys and other secrets.

Each edge device may have a corresponding public key that can be generated as part of a public/private key pair. For example, edge device 1 604 can have public key 632, edge device 2 606 can have public key 634, edge device 3 608 can have public key 636, and edge device 4 610 can have public key 638. The public keys can be provided to the edge device cloud service 614. When an edge device is associated with a fleet, the public keys of each other edge device associated with the same fleet can be provisioned on the edge devices. For example, during provisioning edge device cloud service 614 can provide public key 634 from edge device 2 606 to edge device 1 604, since both are associated with fleet 1 624. Likewise, edge device cloud service 614 can provide public key 632 from edge device 1 604 to edge device 2 606. Similarly, edge device 3 608 and edge device 4 610 can be provided with public key 638 and public key 636, respectively. The public keys may also be stored in each edge device's key store.

Edge device cloud service 614 can store configuration information in one or more datastores. For example, CSP 612 can include fleet datastore 616. The fleet datastore 616 may be configured to generate and/or maintain master keys 618 (e.g., copies of fleet 1 master key 630, fleet 2 master key 640) for the fleets managed by edge device cloud service 614. The fleet datastore 616 may also be configured to maintain public keys 620. Public keys 620 can include the public keys of all edge devices configured by the edge device cloud service 614. In some embodiments, the edge device cloud service 614 can retrieve stored keys from fleet datastore 616 for use when configuring additional edge devices. For example, if a new edge device is to be added to fleet 1 624, the edge device cloud service 614 can retrieve the fleet 1 master key 630, public key 632, and public key 634 from fleet datastore 616 to provide to the new edge device. In addition, when configuring the new edge device, edge device cloud service 614 can obtain the public key of the new edge device and store it with public keys 620 in fleet datastore 616. In this way, the existing fleets can be expanded with additional edge devices.

In some embodiments, edge devices may be delivered to a destination site without being configured by the edge device cloud service 614 and associated with a fleet. For example, certain customers may wish to configure clusters of edge devices without configuration information being maintained by the CSP 612. In these cases, the customer may be provided with a master key to use when configuring the edge devices, and this master key will otherwise act like the fleet master encryption keys described above.

Figure 7:
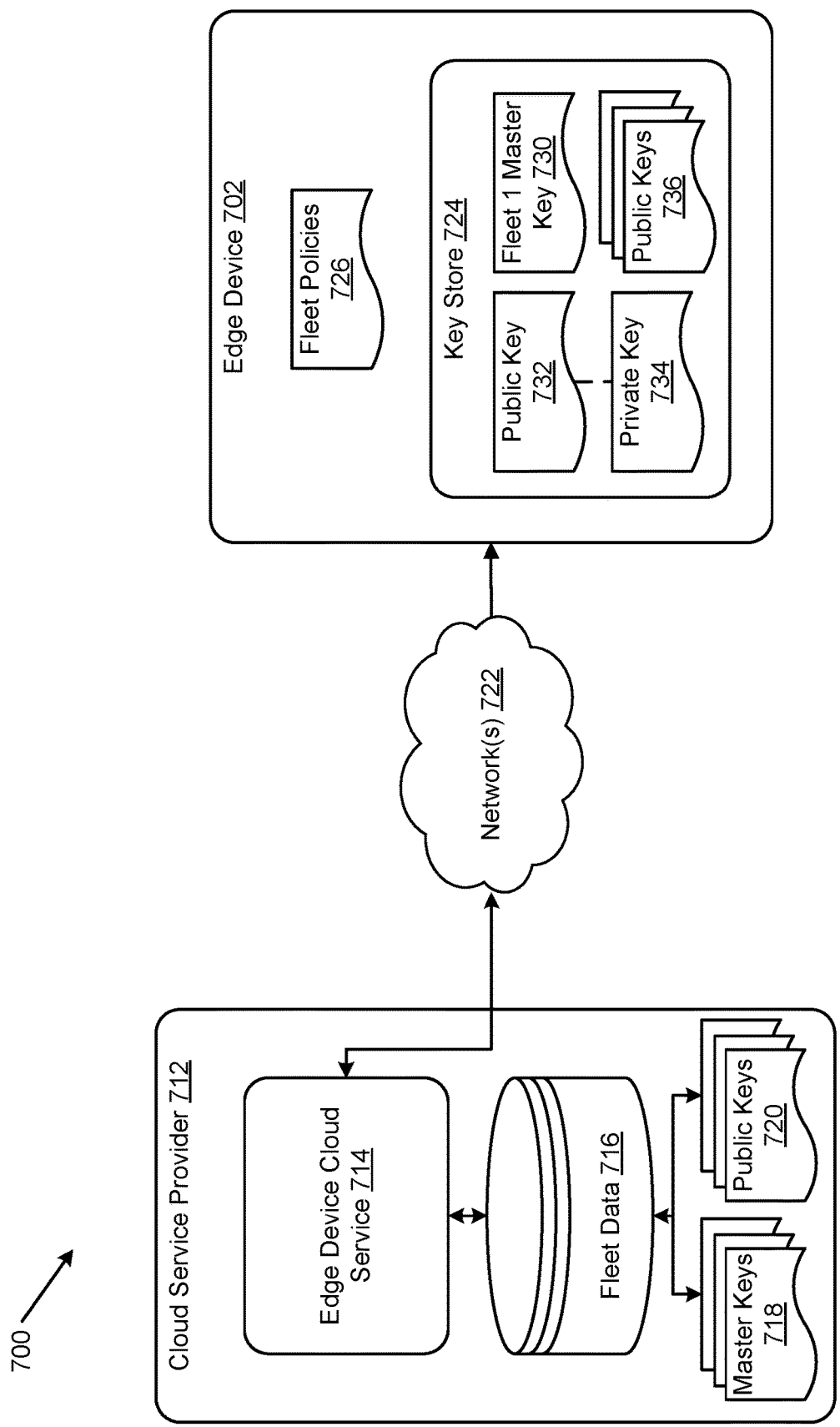
FIG. 7 is a block diagram depicting configuring an edge device with encryption keys as part of associating the edge device with a fleet, according to some embodiments.

FIG. 7 is a block diagram depicting configuring an edge device 702 with encryption keys as part of associating the edge device with a fleet in a distributed computing system 700, according to some embodiments. The edge device 702 may be an example of other edge devices described herein, including edge device 300 of FIG. 3. The configuration of the edge device 702 can be performed by an edge device cloud service 714 of a CSP 712. The CSP 712 may be an example of CSP 612 described above with respect to FIG. 6, while edge device cloud service 714 may be an example of edge device cloud service 714 of FIG. 6. The edge device cloud service 714 can communicate with the edge device 702 over network(s) 722, which may be an example of network(s) 622 of FIG. 6.

Edge device 702 may be associated with fleet 1. Configuring edge device 702 can include providing fleet 1 master key 730 to edge device 702. Fleet 1 master key 730 may be stored by edge device cloud service 714 in the fleet datastore 716 as part of the master keys 718 maintained by edge device cloud service 714. Configuring edge device 702 can also include providing public keys 736 to the edge device 702. The public keys 736 can include the public keys of other edge devices associated with fleet 1. In some embodiments, edge device 702 may be the only edge device initially configured for fleet 1. For example, in a small scale deployment, a fleet of a single edge device may be sufficient to provide the cloud computing functionality. In this case, since no other edge devices are associated with fleet 1, the public keys 736 may not be provided to edge device 702 (as they do not yet exist). As the resources required from the edge device fleet expand, additional edge devices may be added to fleet 1 to increase the size and computing capabilities of the cluster.

Edge device 702 can also include a public/private key pair that includes public key 732 and private key 734. The public key 732 and private key 734 may be generated by any suitable technique for generating encryption keys for public key encryption. The edge device 702 can provide the public key 732 to the edge device cloud service 714. The edge device cloud service 714 can in turn store the public key 732 as part of public keys 720 in the fleet datastore 716.

The edge device 702 can store encryption keys, certificates, and other secrets in a keys store 724. Key store 724 may be implemented as a distinct chip, TPM, HSM, an integrated circuit platform, or other hardware, firmware, and/or software for providing secure storage and security management of stored secrets, including encryption keys like public key 732, private key 734, fleet 1 master key 730, and public keys 736. The key store 724 may be separately encrypted by the edge device 702.

In some embodiments, in addition to providing encryption keys to edge device 702, the edge device cloud service 714 can also provide one or more fleet policies 726. The fleet policies 726 can include rules, configuration settings, and other information that specifies the behavior of edge devices within a fleet. For example, fleet policies 726 may include rules for networking protocols (e.g., ports, link settings, communication protocols, etc.) that edge device 702 can use when connecting to and communicating with other edge devices in the fleet. Fleet policies 726 may also specify parameters of the authorization and authentication used to establish trust between edge device 702 and other edge devices (e.g., new edge devices added to the fleet). For example, fleet policies 726 may specify the parameters (e.g., timing, protocol, etc.) of the authorization/authentication message(s) used to establish trust when a new edge device is installed into a cluster of an existing fleet. Additional details of the trust establishment process are provided below with respect to FIGS. 8-10.

Figure 8:
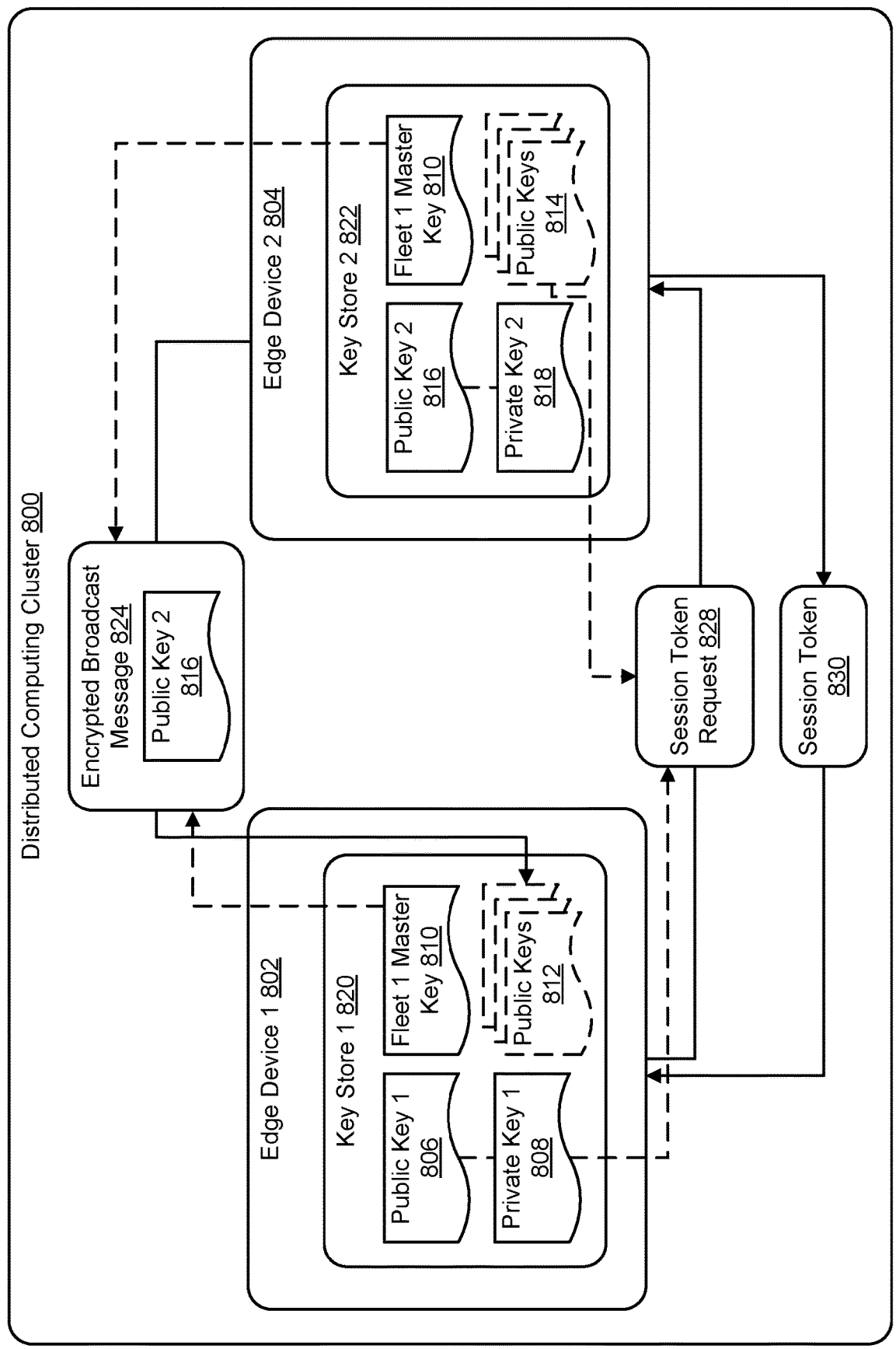
FIG. 8 is a block diagram depicting communications between two edge devices in a distributed computing cluster, according to some embodiments.

FIG. 8 is a block diagram depicting communications between two edge devices in a distributed computing cluster 800, according to some embodiments. The distributed computing cluster may be an example of other distributed computing clusters described herein, including distributed computing cluster 502 of FIG. 5. The edge device 1 802 and edge device 2 804 may be examples of other edge devices described herein, including edge device 702 of FIG. 7 and edge device 300 of FIG. 3.

Edge device 1 802 and edge device 2 804 may be associated with a fleet (e.g., fleet 1). Edge device 2 804 may be a new edge device to the distributed computing cluster 800. Thus, edge device 2 804 may be configured with the public keys (e.g., public keys 814 that include public key 806) of the existing edge devices (e.g., edge device 1 802) of distributed computing cluster 800, while edge device 1 802 may be configured with public keys (e.g., public keys 812) that does not include the public key 2 816 of edge device 2 804. Because edge device 1 802 does not have the public key 2 816 of edge device 2 804 (or any related certificate or other information attesting to the identity of edge device 2 804), edge device 1 802 cannot verify messages sent from edge device 2 804 that use private key 2 818. For example, if edge device 2 804 were to send a message to edge device 1 802 encrypted with (or cryptographically signed with) private key 2 818, edge device 1 802 would not be able to decrypt the message (or verify the signature) without public key 2 816.

Since distributed computing cluster 800 may not have external network access to a CSP (e.g., CSP 712 of FIG. 7) with which to obtain the public key 732, edge device 2 804 can provide its public key 2 816 to edge device 1 802 in a secure and trusted manner. Edge device 2 804 can send an encrypted broadcast message 824 to edge device 1 802. Edge device 2 804 can encrypt the encrypted broadcast message 824 using the fleet 1 master key 810. When receiving the encrypted broadcast message 824, edge device 1 802 can decrypt it using its copy of fleet 1 master key 810. If the decryption is successful, then edge device 2 804 is verified as a legitimate device associated with fleet 1. Edge device 1 802 can then update its store of public keys 812 with public key 2 816. In some embodiments, the encrypted broadcast message 824 can also include a network address corresponding to edge device 2 804. The network address can serve as an identifier for edge device 2 804 within the distributed computing cluster 800. Upon a success decryption of the encrypted broadcast message 824, edge device 1 802 can also store the network address of edge device 2 804 and associate that network address with a trusted device within the distributed computing cluster 800.

The above description can apply for multiple edge devices in the cluster. For example, multiple new edge devices may be added to the distributed computing cluster 800 simultaneously as part of fleet 1. Each of these new edge devices may be configured the public keys (e.g., public key 1 806, public key 2 816) of the existing edge devices in the fleet. Each of the new edge devices can send an encrypted broadcast message to every other edge device in the distributed computing cluster 800. Upon receipt, all of the edge devices can decrypt the encrypted broadcast messages from each other edge device using the shared fleet 1 master key 810. Successful decryption of the received broadcast message can authenticate the new edge devices, and the shared public keys can be added to the stored public keys of the edge devices.

Once edge device 1 802 has updated the public keys 812 with public key 2 816, edge device 1 802 and edge device 2 804 can establish an authorized and authenticated communication channel using session tokens. To obtain a session token, edge device 1 802 can send a session token request 828 to edge device 2 804. The session token request 828 can be cryptographically signed by edge device 1 802 using private key 1 808. Upon receipt of the session token request 828, edge device 2 804 can verify the signature of the session token request 828 using the copy of public key 1 806 stored with public keys 814. If the verification of the signature is successful, then edge device 2 804 can trust that the session token request 828 was validly sent from edge device 1 802. In response, edge device 2 804 can send session token 830 to edge device 1 802. Subsequent requests from edge device 1 802 (e.g., an API request) can include the session token 830 that attests to the valid authentication of edge device 1 802 demonstrated when resolving the session token request 828.

Figure 9:
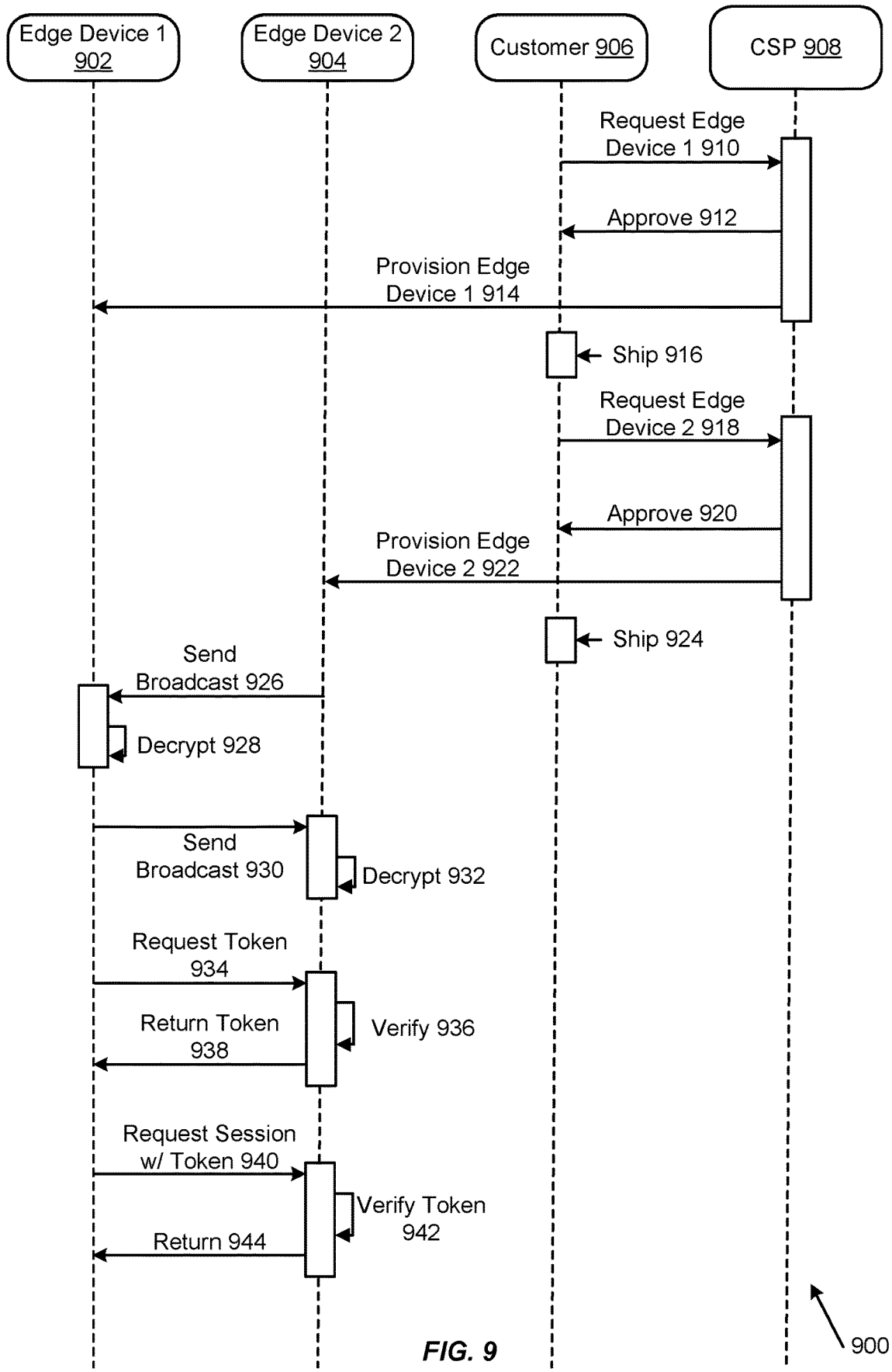
FIG. 9 is an example flow for the provisioning and deployment of two edge devices, according to some embodiments.

FIG. 9 is an example flow 900 for the provisioning and deployment of two edge devices, according to some embodiments. A CSP 908 may provision edge device 1 902 and edge device 2 904 for a customer 906 of the CSP 908 using an edge device cloud service. Edge device 1 902 and edge device 2 904 may be similar to edge device 1 802 and edge device 2 804 described above with respect to FIG. 8, while CSP 908 may be similar to CSP 712 of FIG. 7.

At step 910, customer 906 can request an edge device 1 902. The request can be evaluated by CSP 908, which can approve the request at step 912. Once approved, CSP 908 can provision edge device 1 902, at step 914. Provisioning edge device 1 902 can include associating edge device 1 902 with a fleet managed by the CSP 908, providing public keys of other edge devices associated with the fleet if any, and providing a fleet master key. These encryption keys may be stored in a key store of edge device 1 902. The CSP 908 can also perform other operations to configure edge device 1 902 for operation according to the requirements of customer 906. For example, edge device 1 902 can be provisioned with appropriate software to provide the desired cloud services at the edge location. Once configured, the CSP 908 can ship the edge device 1 902 to customer 906.

At step 918, customer 906 can request edge device 2 904. The request can specify that edge device 2 904 is to be added to the same fleet as edge device 1 902. Similarly to the request for edge device 1, the CSP 908 can evaluate the request and approve the request at step 920. Once approved, CSP 908 can provision edge device 2 904, at step 922. Provisioning edge device 2 904 can include associating edge device 2 904 with the fleet, providing public keys of other edge devices associated with the fleet including a public key of edge device 1 902, and providing the fleet master key. These encryption keys may be stored in a key store of edge device 2 904. The CSP 908 can also perform other operations to configure edge device 2 904 for operation according to the requirements of customer 906. Once configured, the CSP 908 can ship the edge device 2 904 to customer 906.

Once the edge device 1 902 and edge device 2 904 are installed at the destination site (e.g., installed as part of a distributed computing cluster), each edge device can establish trust with the other edge device. At step 926 edge device 2 904 can send an encrypted broadcast message (e.g., encrypted broadcast message 824 of FIG. 8) to edge device 1 902. The encrypted broadcast message can include a public key of edge device 2 904. The encrypted broadcast message can be encrypted using the fleet master key. At step 928, edge device 1 902 can decrypt the encrypted broadcast message using the fleet master key stored at edge device 1 902. If the decryption is successful, then edge device 1 902 can add the public key of edge device 2 904 to its key store.

In addition to or alternatively, edge device 1 902 can send an encrypted broadcast message to edge device 2 904, at step 930. The encrypted broadcast message can include the public key of edge device 1 902. Edge device 2 904 can decrypt the encrypted broadcast message using the fleet master key. If the decryption is successful, then edge device 2 904 can add the public key of edge device 1 902 to its key store, if necessary. In some embodiments, all edge devices in the same fleet and connected together in a network within a cluster can send encrypted broadcast messages to all other edge devices in the fleet. The conditions under which the encrypted broadcast messages are sent (e.g., upon detecting new devices within the cluster network, during an initial startup of a new edge device, etc.) may specified in a fleet policy (e.g., fleet policies 726 of FIG. 7).

At step 934, edge device 1 902 can request a session token from edge device 2 904. The request for the session token can be signed using the public key of edge device 2 904 that was received as part of an encrypted broadcast message. At step 936, edge device 2 904 can verify the request for the session token by verifying the signature using the private key of edge device 2 904. If the signature is correctly verified, then edge device 2 904 can return the requested session token to edge device 1 902. In some embodiments, similar steps to steps 934-938 can be performed with edge device 2 904 requesting a session token from edge device 1 902.

At step 940, edge device 1 902 can establish an authenticated communication channel using the received session token. Edge device 1 902 can send a request (e.g., API request) with the token. At step 942, edge device 2 942 can verify the received session token by comparing it with the token that was provided at step 938. If the token matches, then edge device 2 904 can respond to the request and provide a return to edge device 1 902, at step 944.

Figure 10:
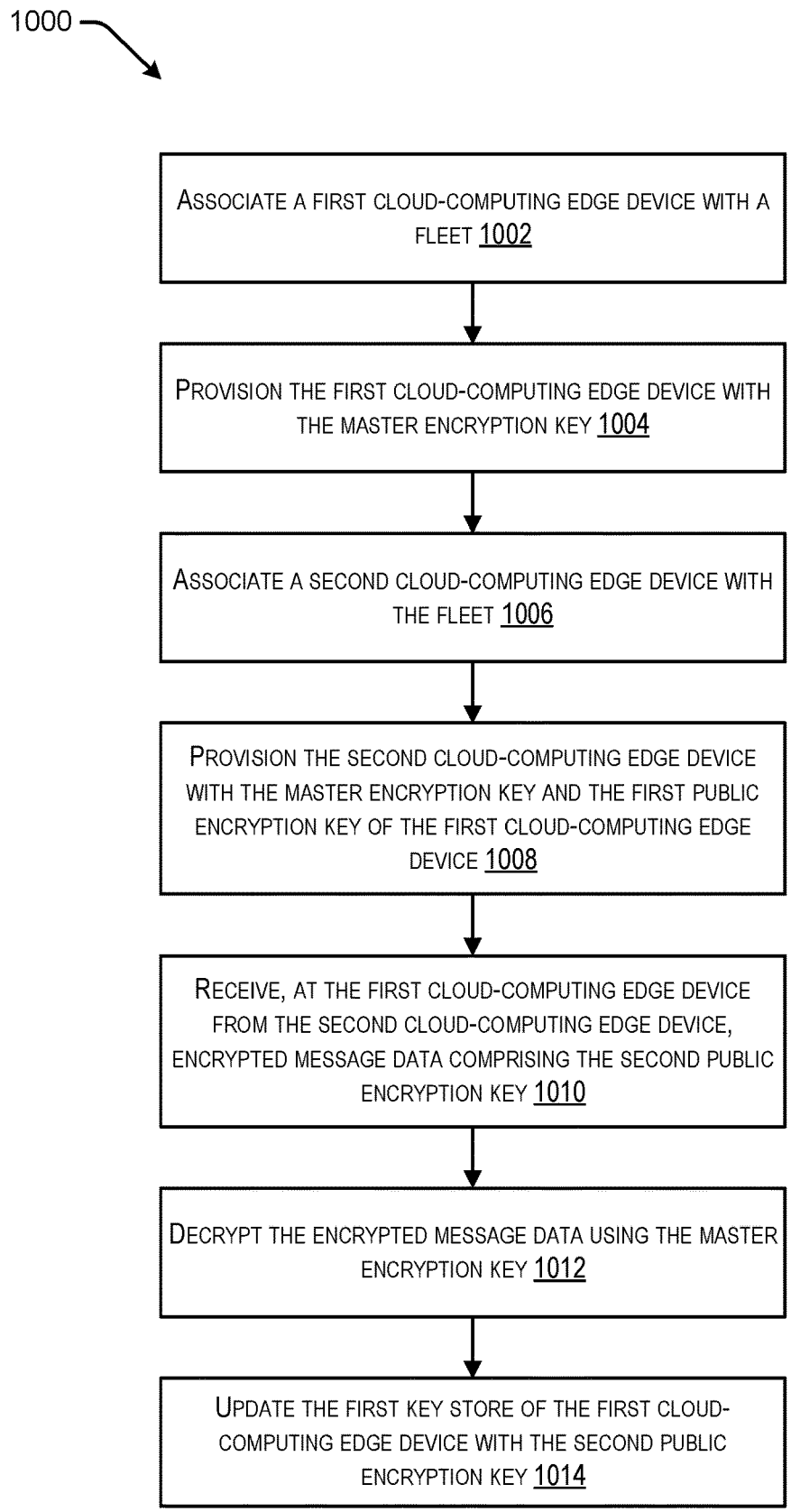
FIG. 10 is an example process for establishing trust between two edge devices in a distributed computing system, according to some embodiments.

FIG. 10 is an example process 1000 for establishing trust between two edge devices in a distributed computing system, according to some embodiments. The edge devices can operate in a distributed computing cluster (e.g., distributed computing cluster 800 of FIG. 8), and may be initially provisioned by an edge device cloud service (e.g., edge device cloud service 614 of FIG. 6). The edge devices may be examples of other edges described herein, including edge device 1 902 and edge device 2 904 of FIG. 9. The process 1000 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Some, any, or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At block 1002, an edge device cloud service can associate a first cloud-computing edge device with a fleet of cloud-computing edge devices. Associating the first cloud-computing edge device can include obtaining a first public encryption key (e.g., public key 1 806 of FIG. 8) of the first cloud-computing edge device. The first public encryption key may be part of a public/private key pair corresponding to the first cloud-computing edge device. The first public encryption key can be stored in a fleet datastore (e.g., fleet datastore 616 of FIG. 6) with other public encryption keys of the fleets managed by the edge device cloud service. The edge device cloud service may also maintain a master encryption key associated with the fleet. For example, each fleet managed by the edge device cloud service can have an AES-256 encryption key that can be provided to every edge device associated with the fleet during configuration of the edge devices. The edge device cloud service can store the master encryption keys in the fleet datastore (e.g., as master keys 618 of FIG. 6).

At block 1004, the edge device cloud service can provision the first cloud-computing edge device with the master encryption key (e.g., fleet 1 master key 810 of FIG. 8). Provisioning the first cloud-computing edge device can include providing the master encryption key to the first cloud-computing edge device. The first cloud-computing edge device can store the master encryption key in a first key store, which can be a TPM in some embodiments.

At block 1006, the edge device cloud service can associate a second cloud-computing edge device with the fleet. Associating the second cloud-computing edge device can include obtaining a second public encryption key (e.g., public key 2 816 of FIG. 8) of the second cloud-computing edge device. The second public encryption key may be part of a second public/private key pair corresponding to the second cloud-computing edge device. The edge device cloud service can maintain the second public encryption key in the fleet datastore.

At block 1008, the edge device cloud service can provision the second cloud-computing edge device with the master encryption key and the first public encryption key. In some embodiments, the first cloud-computing edge device may be associated with the fleet prior to the second cloud-computing edge device, so that the second public key is not yet available to the edge device cloud service for provisioning to the first cloud-computing edge device. The second cloud-computing edge device can store the master encryption key and the first public encryption key in a second key store of the second cloud-computing edge device. The second key store can be a TPM in some embodiments.

At block 1010, the first cloud-computing edge device can receive encrypted message data from the second cloud-computing edge device. The encrypted message data can be part of an encrypted broadcast message (e.g., encrypted broadcast message 824 of FIG. 8). The encrypted message data can include the second public encryption key. The encrypted message data can be generated by the second cloud-computing edge device using the master encryption key. For example, the second cloud-computing edge device can encrypt the second public encryption key using the master encryption key. In some embodiments, the second cloud-computing edge device can cryptographically sign the message data including the second public encryption key.

At block 1012, the first cloud-computing edge device can decrypt the encrypted message data using the master encryption key stored in the first key store. Because the first cloud-computing edge device and the second cloud-computing edge device were provisioned as part of the same fleet, they should store the same shared master encryption key for the fleet. If the decryption is successful (e.g., the master encryption key matches at both edge devices, indicating authentic devices within the cluster), the first cloud-computing edge device can update the first key store with the second public encryption key, at block 1014. The first cloud-computing edge device can then have a trust-verified version of the public key of the second cloud-computing edge device without connecting to a cloud service or other external network entity (e.g., a certificate authority) to obtain the authentication information. In some embodiments, the encrypted message data can also include a network address corresponding to the second cloud-computing edge device. The first cloud-computing edge device can then validate the request by at least comparing the network address received in the encrypted message data with a network address of the second cloud-computing edge device associated with the communication channel over which the encrypted message data was received.

In some embodiments, the edge device cloud service can associate a third cloud-computing edge device, a fourth cloud-computing edge device, or more cloud-computing edge devices to the fleet. Similarly to first cloud-computing edge device and the second cloud-computing edge device, associating the third cloud-computing edge device can include obtaining a third public encryption key and storing the third public encryption key with the public keys of the fleet. The edge device cloud service can then provision the third cloud-computing edge device with the master encryption key and the first public encryption key and the second public encryption key of the first cloud-computing edge device and the second cloud-computing edge device, respectively.

In some embodiments, the first cloud-computing edge device can receive a request for a session token from the second cloud-computing edge device. The request can include a cryptographic signature generated using the second private encryption key, which can be stored in the second key store of the second cloud-computing edge device. Upon receiving the request, the first cloud-computing edge device can verify the signature using the second public encryption key stored in the first key store. Because the second public encryption key and the second private encryption key are part of a public/private key pair, each key can be used as part of public key encryption methods to generate and verify cryptographic signatures. If the signature is successfully verified, the first cloud-computing edge device can send the session token to the second cloud-computing edge device.

In some embodiments, the first cloud-computing edge device can send an application programming interface (API) request to the second cloud-computing edge device. The API request can include a session token previously received from the second cloud-computing edge device. In response, the first cloud-computing edge device can receive an indication from the second cloud-computing edge device that the API request was successfully completed. The indication can be generated based at least in part on a successful validation of the session token by the second cloud-computing edge device.

In some embodiments, the first cloud-computing edge device can receive additional encrypted message data from the second cloud-computing edge device. The additional encrypted message data can include an updated public encryption key. For example, the second cloud-computing edge device may generate a new public/private key pair for use in secure communication within the distributed computing cluster. The additional encrypted message data can be encrypted using the master encryption key. The first cloud-computing edge device can decrypt the additional encrypted message date with the master encryption key and then update the first key store with the updated public encryption key.

In some embodiments, the edge device cloud service can provision the first cloud-computing edge device or the second cloud-computing edge device with one or more fleet policies (e.g., fleet policies 726 of FIG. 7). The fleet policy can specify a plurality of allowable actions for the fleet of cloud-computing edge devices. For example, the fleet policy can include rules for networking protocols (e.g., ports, link settings, communication protocols, etc.) that the first cloud-computing edge device can use when connecting to and communicating with the second cloud-computing edge device. The fleet policy can also specify parameters of the authorization and authentication used to establish trust between the first cloud-computing edge device and the second cloud-computing edge device. For example, the fleet policy may specify the parameters (e.g., timing, protocol, etc.) of the broadcast message used to establish trust when a new edge device is installed into a cluster of an existing fleet. The first cloud-computing edge device can receive a request from the second cloud-computing edge device usable to perform an action. In response, the first cloud-computing edge device can then perform the action if the action is one of the allowable actions.

Example Infrastructure as a Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model may require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand)) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed may need to first be set up. In some instances, the provisioning can be done manually, a provisioning tool may be utilized to provision the resources, and/or deployment tools may be utilized to deploy the code once the infrastructure is provisioned.

Figure 11:
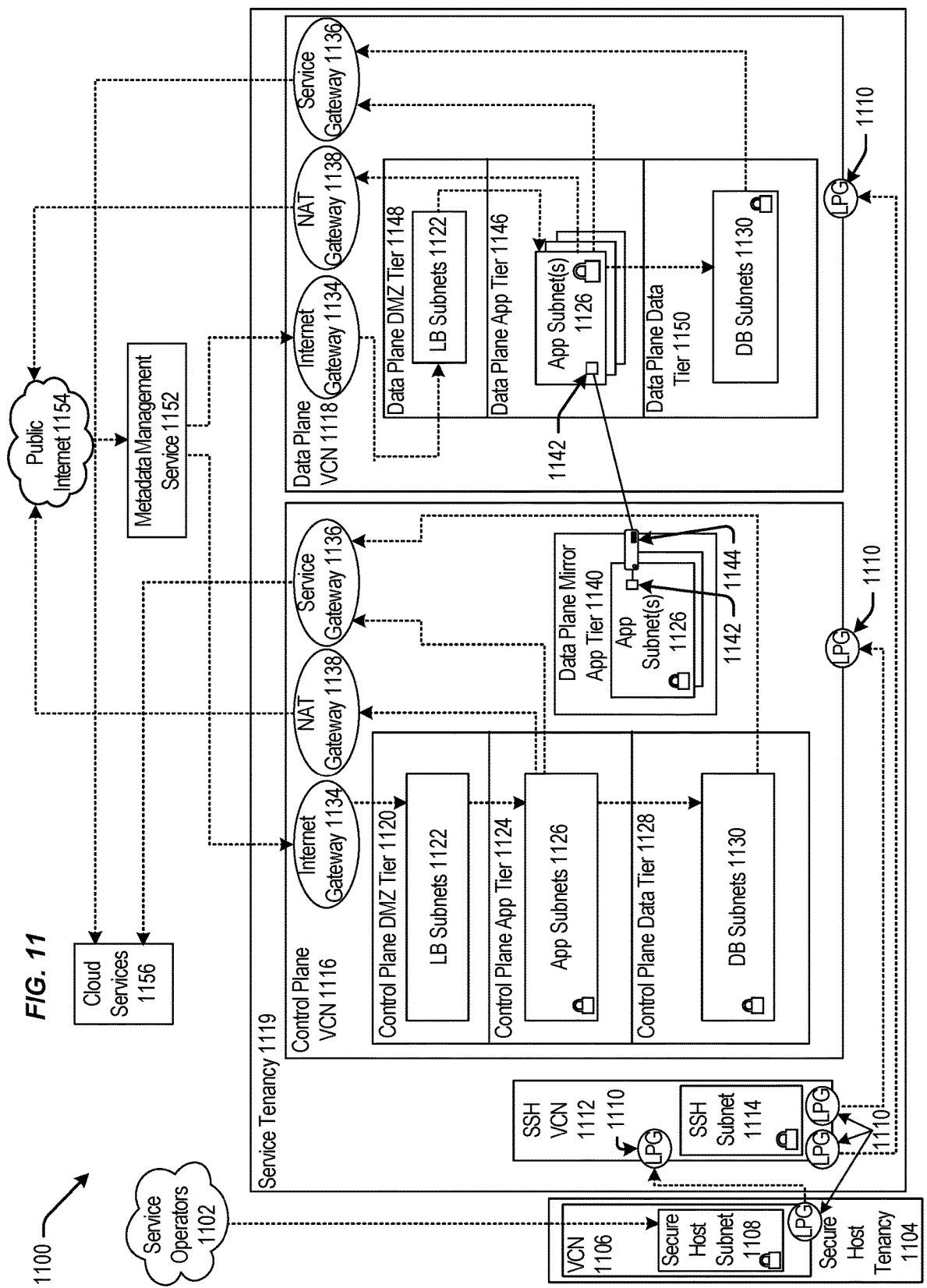
FIG. 11 is a block diagram illustrating one pattern for implementing a cloud infrastructure as a service system, according to at least one embodiment.

FIG. 11 is a block diagram 1100 illustrating an example pattern of an IaaS architecture, according to at least one embodiment. Service operators 1102 can be communicatively coupled to a secure host tenancy 1104 that can include a virtual cloud network (VCN) 1106 and a secure host subnet 1108. In some examples, the service operators 1102 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1106 and/or the Internet.

The VCN 1106 can include a local peering gateway (LPG) 1110 that can be communicatively coupled to a secure shell (SSH) VCN 1112 via an LPG 1110 contained in the SSH VCN 1112. The SSH VCN 1112 can include an SSH subnet 1114, and the SSH VCN 1112 can be communicatively coupled to a control plane VCN 1116 via the LPG 1110 contained in the control plane VCN 1116. Also, the SSH VCN 1112 can be communicatively coupled to a data plane VCN 1118 via an LPG 1110. The control plane VCN 1116 and the data plane VCN 1118 can be contained in a service tenancy 1119 that can be owned and/or operated by the IaaS provider.

The control plane VCN 1116 can include a control plane demilitarized zone (DMZ) tier 1120 that acts as a perimeter network (e.g., portions of a corporate network between the corporate intranet and external networks). The DMZ-based servers may have restricted responsibilities and help keep breaches contained. Additionally, the DMZ tier 1120 can include one or more load balancer (LB) subnet(s) 1122, a control plane app tier 1124 that can include app subnet(s) 1126, a control plane data tier 1128 that can include database (DB) subnet(s) 1130 (e.g., frontend DB subnet(s) and/or backend DB subnet(s)). The LB subnet(s) 1122 contained in the control plane DMZ tier 1120 can be communicatively coupled to the app subnet(s) 1126 contained in the control plane app tier 1124 and an Internet gateway 1134 that can be contained in the control plane VCN 1116, and the app subnet(s) 1126 can be communicatively coupled to the DB subnet(s) 1130 contained in the control plane data tier 1128 and a service gateway 1136 and a network address translation (NAT) gateway 1138. The control plane VCN 1116 can include the service gateway 1136 and the NAT gateway 1138.

The control plane VCN 1116 can include a data plane mirror app tier 1140 that can include app subnet(s) 1126. The app subnet(s) 1126 contained in the data plane mirror app tier 1140 can include a virtual network interface controller (VNIC) 1142 that can execute a compute instance 1144. The compute instance 1144 can communicatively couple the app subnet(s) 1126 of the data plane mirror app tier 1140 to app subnet(s) 1126 that can be contained in a data plane app tier 1146.

The data plane VCN 1118 can include the data plane app tier 1146, a data plane DMZ tier 1148, and a data plane data tier 1150. The data plane DMZ tier 1148 can include LB subnet(s) 1122 that can be communicatively coupled to the app subnet(s) 1126 of the data plane app tier 1146 and the Internet gateway 1134 of the data plane VCN 1118. The app subnet(s) 1126 can be communicatively coupled to the service gateway 1136 of the data plane VCN 1118 and the NAT gateway 1138 of the data plane VCN 1118. The data plane data tier 1150 can also include the DB subnet(s) 1130 that can be communicatively coupled to the app subnet(s) 1126 of the data plane app tier 1146.

The Internet gateway 1134 of the control plane VCN 1116 and of the data plane VCN 1118 can be communicatively coupled to a metadata management service 1152 that can be communicatively coupled to public Internet 1154. Public Internet 1154 can be communicatively coupled to the NAT gateway 1138 of the control plane VCN 1116 and of the data plane VCN 1118. The service gateway 1136 of the control plane VCN 1116 and of the data plane VCN 1118 can be communicatively couple to cloud services 1156.

In some examples, the service gateway 1136 of the control plane VCN 1116 or of the data plane VCN 1118 can make application programming interface (API) calls to cloud services 1156 without going through public Internet 1154. The API calls to cloud services 1156 from the service gateway 1136 can be one-way: the service gateway 1136 can make API calls to cloud services 1156, and cloud services 1156 can send requested data to the service gateway 1136. But, cloud services 1156 may not initiate API calls to the service gateway 1136.

In some examples, the secure host tenancy 1104 can be directly connected to the service tenancy 1119, which may be otherwise isolated. The secure host subnet 1108 can communicate with the SSH subnet 1114 through an LPG 1110 that may enable two-way communication over an otherwise isolated system. Connecting the secure host subnet 1108 to the SSH subnet 1114 may give the secure host subnet 1108 access to other entities within the service tenancy 1119.

The control plane VCN 1116 may allow users of the service tenancy 1119 to set up or otherwise provision desired resources. Desired resources provisioned in the control plane VCN 1116 may be deployed or otherwise used in the data plane VCN 1118. In some examples, the control plane VCN 1116 can be isolated from the data plane VCN 1118, and the data plane mirror app tier 1140 of the control plane VCN 1116 can communicate with the data plane app tier 1146 of the data plane VCN 1118 via VNICs 1142 that can be contained in the data plane mirror app tier 1140 and the data plane app tier 1146.

In some examples, users of the system, or customers, can make requests, for example create, read, update, or delete (CRUD) operations, through public Internet 1154 that can communicate the requests to the metadata management service 1152. The metadata management service 1152 can communicate the request to the control plane VCN 1116 through the Internet gateway 1134. The request can be received by the LB subnet(s) 1122 contained in the control plane DMZ tier 1120. The LB subnet(s) 1122 may determine that the request is valid, and in response to this determination, the LB subnet(s) 1122 can transmit the request to app subnet(s) 1126 contained in the control plane app tier 1124. If the request is validated and requires a call to public Internet 1154, the call to public Internet 1154 may be transmitted to the NAT gateway 1138 that can make the call to public Internet 1154. Memory that may be desired to be stored by the request can be stored in the DB subnet(s) 1130.

In some examples, the data plane mirror app tier 1140 can facilitate direct communication between the control plane VCN 1116 and the data plane VCN 1118. For example, changes, updates, or other suitable modifications to configuration may be desired to be applied to the resources contained in the data plane VCN 1118. Via a VNIC 1142, the control plane VCN 1116 can directly communicate with, and can thereby execute the changes, updates, or other suitable modifications to configuration to, resources contained in the data plane VCN 1118.

In some embodiments, the control plane VCN 1116 and the data plane VCN 1118 can be contained in the service tenancy 1119. In this case, the user, or the customer, of the system may not own or operate either the control plane VCN 1116 or the data plane VCN 1118. Instead, the IaaS provider may own or operate the control plane VCN 1116 and the data plane VCN 1118, both of which may be contained in the service tenancy 1119. This embodiment can enable isolation of networks that may prevent users or customers from interacting with other users', or other customers', resources. Also, this embodiment may allow users or customers of the system to store databases privately without needing to rely on public Internet 1154, which may not have a desired level of threat prevention, for storage.

In other embodiments, the LB subnet(s) 1122 contained in the control plane VCN 1116 can be configured to receive a signal from the service gateway 1136. In this embodiment, the control plane VCN 1116 and the data plane VCN 1118 may be configured to be called by a customer of the IaaS provider without calling public Internet 1154. Customers of the IaaS provider may desire this embodiment since database(s) that the customers use may be controlled by the IaaS provider and may be stored on the service tenancy 1119, which may be isolated from public Internet 1154.

Figure 12:
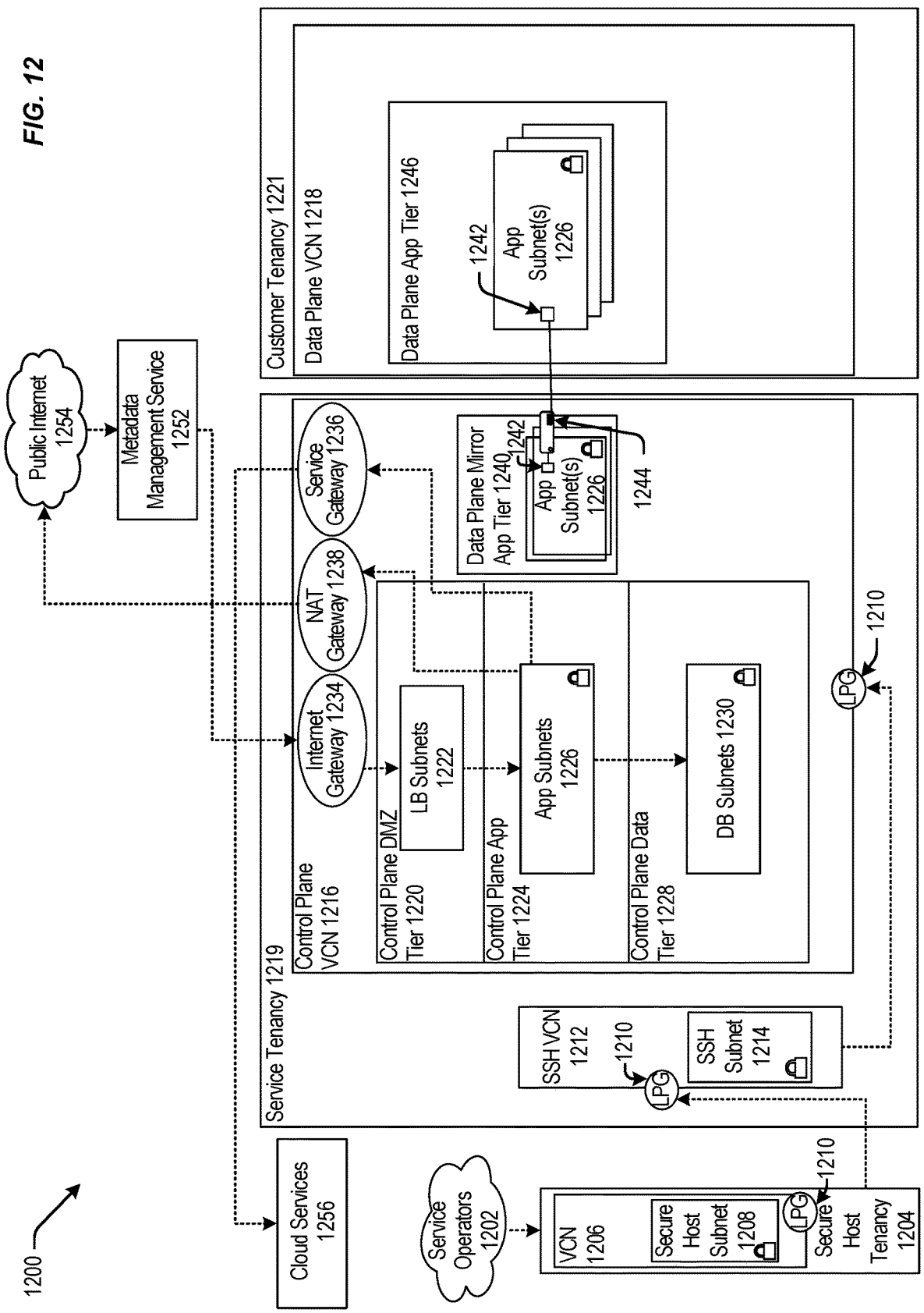
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 1102 of FIG. 11) can be communicatively coupled to a secure host tenancy 1204 (e.g., the secure host tenancy 1104 of FIG. 11) that can include a virtual cloud network (VCN) 1206 (e.g., the VCN 1106 of FIG. 11) and a secure host subnet 1208 (e.g., the secure host subnet 1108 of FIG. 11). The VCN 1206 can include a local peering gateway (LPG) 1210 (e.g., the LPG 1110 of FIG. 11) that can be communicatively coupled to a secure shell (SSH) VCN 1212 (e.g., the SSH VCN 1112 of FIG. 11) via an LPG 1110 contained in the SSH VCN 1212. The SSH VCN 1212 can include an SSH subnet 1214 (e.g., the SSH subnet 1114 of FIG. 11), and the SSH VCN 1212 can be communicatively coupled to a control plane VCN 1216 (e.g., the control plane VCN 1116 of FIG. 11) via an LPG 1210 contained in the control plane VCN 1216. The control plane VCN 1216 can be contained in a service tenancy 1219 (e.g., the service tenancy 1119 of FIG. 11), and the data plane VCN 1218 (e.g., the data plane VCN 1118 of FIG. 11) can be contained in a customer tenancy 1221 that may be owned or operated by users, or customers, of the system.

The control plane VCN 1216 can include a control plane DMZ tier 1220 (e.g., the control plane DMZ tier 1120 of FIG. 11) that can include LB subnet(s) 1222 (e.g., LB subnet(s) 1122 of FIG. 11), a control plane app tier 1224 (e.g., the control plane app tier 1124 of FIG. 11) that can include app subnet(s) 1226 (e.g., app subnet(s) 1126 of FIG. 11), a control plane data tier 1228 (e.g., the control plane data tier 1128 of FIG. 11) that can include database (DB)

subnet(s) 1230 (e.g., similar to DB subnet(s) 1130 of FIG. 11). The LB subnet(s) 1222 contained in the control plane DMZ tier 1220 can be communicatively coupled to the app subnet(s) 1226 contained in the control plane app tier 1224 and an Internet gateway 1234 (e.g., the Internet gateway 1134 of FIG. 11) that can be contained in the control plane VCN 1216, and the app subnet(s) 1226 can be communicatively coupled to the DB subnet(s) 1230 contained in the control plane data tier 1228 and a service gateway 1236 (e.g., the service gateway of FIG. 11) and a network address translation (NAT) gateway 1238 (e.g., the NAT gateway 1138 of FIG. 11). The control plane VCN 1216 can include the service gateway 1236 and the NAT gateway 1238.

The control plane VCN 1216 can include a data plane mirror app tier 1240 (e.g., the data plane mirror app tier 1140 of FIG. 11) that can include app subnet(s) 1226. The app subnet(s) 1226 contained in the data plane mirror app tier 1240 can include a virtual network interface controller (VNIC) 1242 (e.g., the VNIC of 1142) that can execute a compute instance 1244 (e.g., similar to the compute instance 1144 of FIG. 11). The compute instance 1244 can facilitate communication between the app subnet(s) 1226 of the data plane mirror app tier 1240 and the app subnet(s) 1226 that can be contained in a data plane app tier 1246 (e.g., the data plane app tier 1146 of FIG. 11) via the VNIC 1242 contained in the data plane mirror app tier 1240 and the VNIC 1242 contained in the data plane app tier 1246.

The Internet gateway 1234 contained in the control plane VCN 1216 can be communicatively coupled to a metadata management service 1252 (e.g., the metadata management service 1152 of FIG. 11) that can be communicatively coupled to public Internet 1254 (e.g., public Internet 1154 of FIG. 11). Public Internet 1254 can be communicatively coupled to the NAT gateway 1238 contained in the control plane VCN 1216. The service gateway 1236 contained in the control plane VCN 1216 can be communicatively couple to cloud services 1256 (e.g., cloud services 1156 of FIG. 11).

In some examples, the data plane VCN 1218 can be contained in the customer tenancy 1221. In this case, the IaaS provider may provide the control plane VCN 1216 for each customer, and the IaaS provider may, for each customer, set up a unique compute instance 1244 that is contained in the service tenancy 1219. Each compute instance 1244 may allow communication between the control plane VCN 1216, contained in the service tenancy 1219, and the data plane VCN 1218 that is contained in the customer tenancy 1221. The compute instance 1244 may allow resources, that are provisioned in the control plane VCN 1216 that is contained in the service tenancy 1219, to be deployed or otherwise used in the data plane VCN 1218 that is contained in the customer tenancy 1221.

In other examples, the customer of the IaaS provider may have databases that live in the customer tenancy 1221. In this example, the control plane VCN 1216 can include the data plane mirror app tier 1240 that can include app subnet(s) 1226. The data plane mirror app tier 1240 can reside in the data plane VCN 1218, but the data plane mirror app tier 1240 may not live in the data plane VCN 1218. That is, the data plane mirror app tier 1240 may have access to the customer tenancy 1221, but the data plane mirror app tier 1240 may not exist in the data plane VCN 1218 or be owned or operated by the customer of the IaaS provider. The data plane mirror app tier 1240 may be configured to make calls to the data plane VCN 1218 but may not be configured to make calls to any entity contained in the control plane VCN 1216. The customer may desire to deploy or otherwise use resources in the data plane VCN 1218 that are provisioned in the control plane VCN 1216, and the data plane mirror app tier 1240 can facilitate the desired deployment, or other usage of resources, of the customer.

In some embodiments, the customer of the IaaS provider can apply filters to the data plane VCN 1218. In this embodiment, the customer can determine what the data plane VCN 1218 can access, and the customer may restrict access to public Internet 1254 from the data plane VCN 1218. The IaaS provider may not be able to apply filters or otherwise control access of the data plane VCN 1218 to any outside networks or databases. Applying filters and controls by the customer onto the data plane VCN 1218, contained in the customer tenancy 1221, can help isolate the data plane VCN 1218 from other customers and from public Internet 1254.

In some embodiments, cloud services 1256 can be called by the service gateway 1236 to access services that may not exist on public Internet 1254, on the control plane VCN 1216, or on the data plane VCN 1218. The connection between cloud services 1256 and the control plane VCN 1216 or the data plane VCN 1218 may not be live or continuous. Cloud services 1256 may exist on a different network owned or operated by the IaaS provider. Cloud services 1256 may be configured to receive calls from the service gateway 1236 and may be configured to not receive calls from public Internet 1254. Some cloud services 1256 may be isolated from other cloud services 1256, and the control plane VCN 1216 may be isolated from cloud services 1256 that may not be in the same region as the control plane VCN 1216. For example, the control plane VCN 1216 may be located in "Region 1," and cloud service "Deployment 11," may be located in Region 1 and in "Region 2." If a call to Deployment 11 is made by the service gateway 1236 contained in the control plane VCN 1216 located in Region 1, the call may be transmitted to Deployment 11 in Region 1. In this example, the control plane VCN 1216, or Deployment 11 in Region 1, may not be communicatively coupled to, or otherwise in communication with, Deployment 11 in Region 2.

Figure 13:
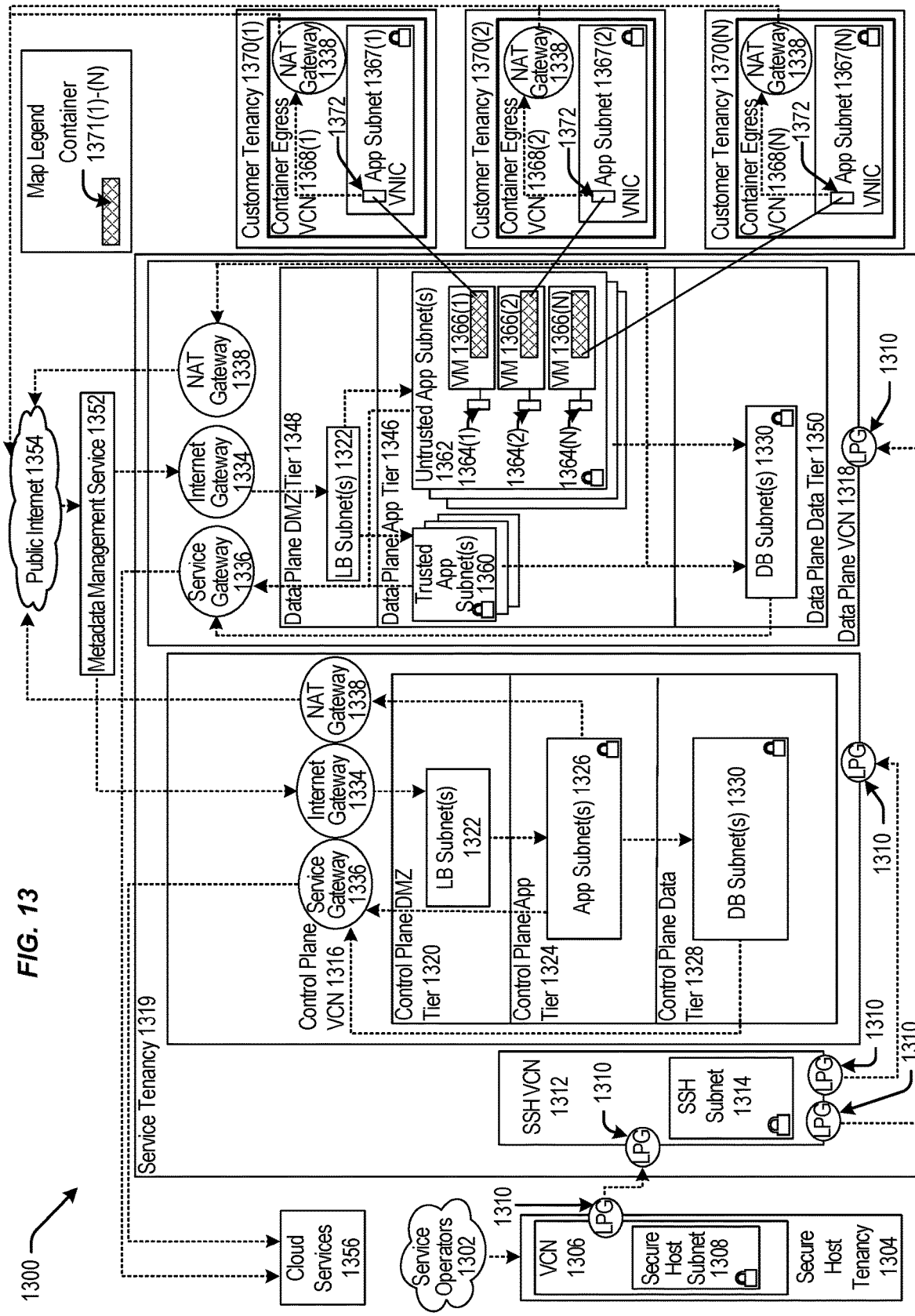
FIG. 13 is a block diagram illustrating another pattern for implementing a cloud infrastructure as a service system, according to at least one embodiment.

FIG. 13 is a block diagram 1300 illustrating another example pattern of an IaaS architecture, according to at least one embodiment. Service operators 1302 (e.g., service operators 1102 of FIG. 11) can be communicatively coupled to a secure host tenancy 1304 (e.g., the secure host tenancy 1104 of FIG. 11) that can include a virtual cloud network (VCN) 1306 (e.g., the VCN 1106 of FIG. 11) and a secure host subnet 1308 (e.g., the secure host subnet 1108 of FIG. 11). The VCN 1306 can include an LPG 1310 (e.g., the LPG 1110 of FIG. 11) that can be communicatively coupled to an SSH VCN 1312 (e.g., the SSH VCN 1112 of FIG. 11) via an LPG 1310 contained in the SSH VCN 1312. The SSH VCN 1312 can include an SSH subnet 1314 (e.g., the SSH subnet 1114 of FIG. 11), and the SSH VCN 1312 can be communicatively coupled to a control plane VCN 1316 (e.g., the control plane VCN 1116 of FIG. 11) via an LPG 1310 contained in the control plane VCN 1316 and to a data plane VCN 1318 (e.g., the data plane 1118 of FIG. 11) via an LPG 1310 contained in the data plane VCN 1318. The control plane VCN 1316 and the data plane VCN 1318 can be contained in a service tenancy 1319 (e.g., the service tenancy 1119 of FIG. 11).

The control plane VCN 1316 can include a control plane DMZ tier 1320 (e.g., the control plane DMZ tier 1120 of FIG. 11) that can include load balancer (LB) subnet(s) 1322 (e.g., LB subnet(s) 1122 of FIG. 11), a control plane app tier 1324 (e.g., the control plane app tier 1124 of FIG. 11) that can include app subnet(s) 1326 (e.g., similar to app subnet(s)

1126 of FIG. 11), a control plane data tier 1328 (e.g., the control plane data tier 1128 of FIG. 11) that can include DB subnet(s) 1330. The LB subnet(s) 1322 contained in the control plane DMZ tier 1320 can be communicatively coupled to the app subnet(s) 1326 contained in the control plane app tier 1324 and to an Internet gateway 1334 (e.g., the Internet gateway 1134 of FIG. 11) that can be contained in the control plane VCN 1316, and the app subnet(s) 1326 can be communicatively coupled to the DB subnet(s) 1330 contained in the control plane data tier 1328 and to a service gateway 1336 (e.g., the service gateway of FIG. 11) and a network address translation (NAT) gateway 1338 (e.g., the NAT gateway 1138 of FIG. 11). The control plane VCN 1316 can include the service gateway 1336 and the NAT gateway 1338.

The data plane VCN 1318 can include a data plane app tier 1346 (e.g., the data plane app tier 1146 of FIG. 11), a data plane DMZ tier 1348 (e.g., the data plane DMZ tier 1148 of FIG. 11), and a data plane data tier 1350 (e.g., the data plane data tier 1150 of FIG. 11). The data plane DMZ tier 1348 can include LB subnet(s) 1322 that can be communicatively coupled to trusted app subnet(s) 1360 and untrusted app subnet(s) 1362 of the data plane app tier 1346 and the Internet gateway 1334 contained in the data plane VCN 1318. The trusted app subnet(s) 1360 can be communicatively coupled to the service gateway 1336 contained in the data plane VCN 1318, the NAT gateway 1338 contained in the data plane VCN 1318, and DB subnet(s) 1330 contained in the data plane data tier 1350. The untrusted app subnet(s) 1362 can be communicatively coupled to the service gateway 1336 contained in the data plane VCN 1318 and DB subnet(s) 1330 contained in the data plane data tier 1350. The data plane data tier 1350 can include DB subnet(s) 1330 that can be communicatively coupled to the service gateway 1336 contained in the data plane VCN 1318.

The untrusted app subnet(s) 1362 can include one or more primary VNICs 1364(1)-(N) that can be communicatively coupled to tenant virtual machines (VMs) 1366(1)-(N). Each tenant VM 1366(1)-(N) can be communicatively coupled to a respective app subnet 1367(1)-(N) that can be contained in respective container egress VCNs 1368(1)-(N) that can be contained in respective customer tenancies 1370(1)-(N). Respective secondary VNICs 1372(1)-(N) can facilitate communication between the untrusted app subnet(s) 1362 contained in the data plane VCN 1318 and the app subnet contained in the container egress VCNs 1368(1)-(N). Each container egress VCNs 1368(1)-(N) can include a NAT gateway 1338 that can be communicatively coupled to public Internet 1354 (e.g., public Internet 1154 of FIG. 11).

The Internet gateway 1334 contained in the control plane VCN 1316 and contained in the data plane VCN 1318 can be communicatively coupled to a metadata management service 1352 (e.g., the metadata management system 1152 of FIG. 11) that can be communicatively coupled to public Internet 1354. Public Internet 1354 can be communicatively coupled to the NAT gateway 1338 contained in the control plane VCN 1316 and contained in the data plane VCN 1318. The service gateway 1336 contained in the control plane VCN 1316 and contained in the data plane VCN 1318 can be communicatively couple to cloud services 1356.

In some embodiments, the data plane VCN 1318 can be integrated with customer tenancies 1370. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1346. Code to run the function may be executed in the VMs 1366(1)-(N), and the code may not be configured to run anywhere else on the data plane VCN 1318. Each VM 1366(1)-(N) may be connected to one customer tenancy 1370. Respective containers 1371(1)-(N) contained in the VMs 1366(1)-(N) may be configured to run the code. In this case, there can be a dual isolation (e.g., the containers 1371(1)-(N) running code, where the containers 1371(1)-(N) may be contained in at least the VM 1366(1)-(N) that are contained in the untrusted app subnet(s) 1362), which may help prevent incorrect or otherwise undesirable code from damaging the network of the IaaS provider or from damaging a network of a different customer. The containers 1371(1)-(N) may be communicatively coupled to the customer tenancy 1370 and may be configured to transmit or receive data from the customer tenancy 1370. The containers 1371(1)-(N) may not be configured to transmit or receive data from any other entity in the data plane VCN 1318. Upon completion of running the code, the IaaS provider may kill or otherwise dispose of the containers 1371(1)-(N).

In some embodiments, the trusted app subnet(s) 1360 may run code that may be owned or operated by the IaaS provider. In this embodiment, the trusted app subnet(s) 1360 may be communicatively coupled to the DB subnet(s) 1330 and be configured to execute CRUD operations in the DB subnet(s) 1330. The untrusted app subnet(s) 1362 may be communicatively coupled to the DB subnet(s) 1330, but in this embodiment, the untrusted app subnet(s) may be configured to execute read operations in the DB subnet(s) 1330. The containers 1371(1)-(N) that can be contained in the VM 1366(1)-(N) of each customer and that may run code from the customer may not be communicatively coupled with the DB subnet(s) 1330.

In other embodiments, the control plane VCN 1316 and the data plane VCN 1318 may not be directly communicatively coupled. In this embodiment, there may be no direct communication between the control plane VCN 1316 and the data plane VCN 1318. However, communication can occur indirectly through at least one method. An LPG 1310 may be established by the IaaS provider that can facilitate communication between the control plane VCN 1316 and the data plane VCN 1318. In another example, the control plane VCN 1316 or the data plane VCN 1318 can make a call to cloud services 1356 via the service gateway 1336. For example, a call to cloud services 1356 from the control plane VCN 1316 can include a request for a service that can communicate with the data plane VCN 1318.

Figure 14:
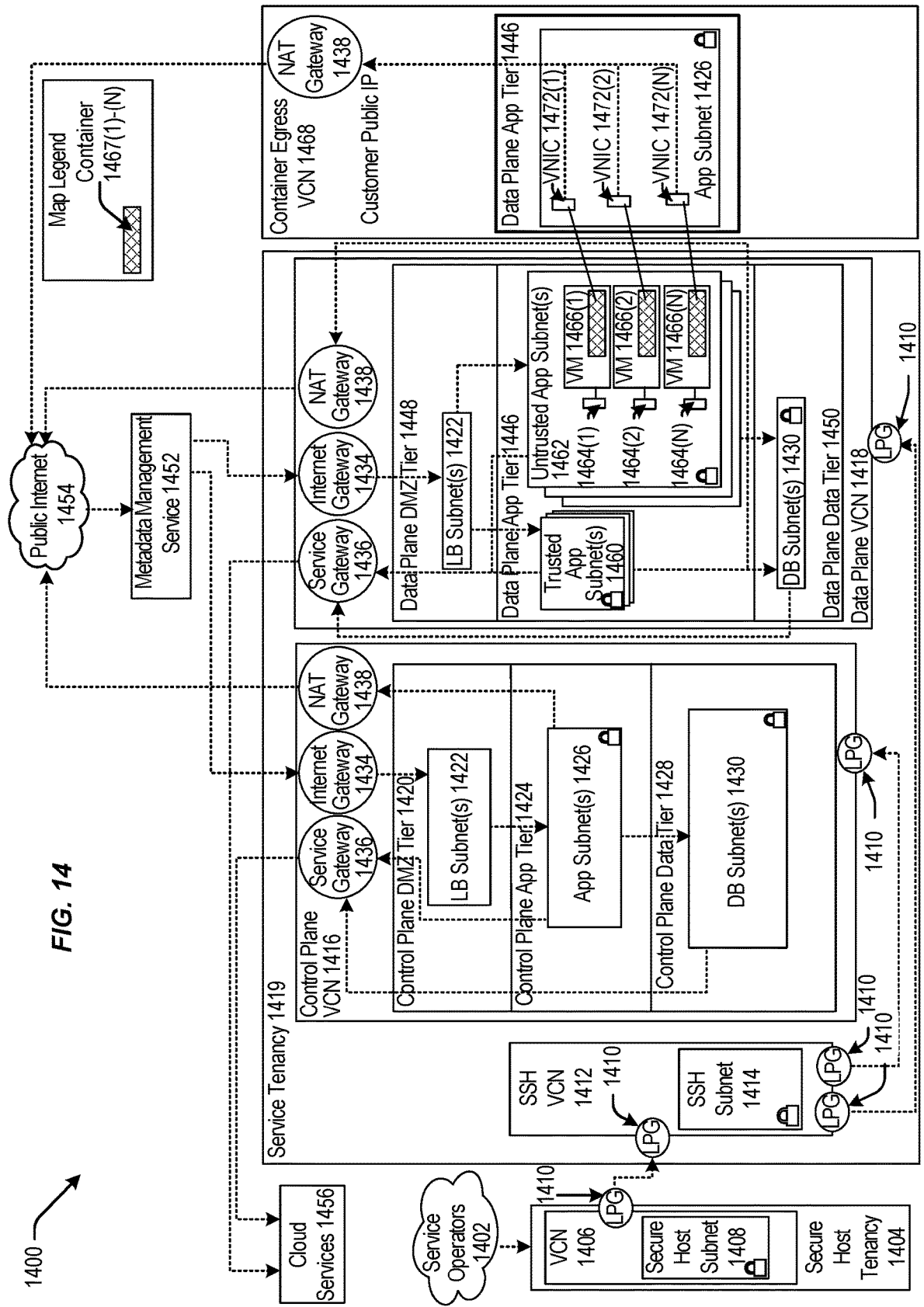
FIG. 14 is a block diagram illustrating another pattern for implementing a cloud infrastructure as a service system, according to at least one embodiment.

FIG. 14 is a block diagram 1400 illustrating another example pattern of an IaaS architecture, according to at least one embodiment. Service operators 1402 (e.g., service operators 1102 of FIG. 11) can be communicatively coupled to a secure host tenancy 1404 (e.g., the secure host tenancy 1104 of FIG. 11) that can include a virtual cloud network (VCN) 1406 (e.g., the VCN 1106 of FIG. 11) and a secure host subnet 1408 (e.g., the secure host subnet 1108 of FIG. 11). The VCN 1406 can include an LPG 1410 (e.g., the LPG 1110 of FIG. 11) that can be communicatively coupled to an SSH VCN 1412 (e.g., the SSH VCN 1112 of FIG. 11) via an LPG 1410 contained in the SSH VCN 1412. The SSH VCN 1412 can include an SSH subnet 1414 (e.g., the SSH subnet 1114 of FIG. 11), and the SSH VCN 1412 can be communicatively coupled to a control plane VCN 1416 (e.g., the control plane VCN 1116 of FIG. 11) via an LPG 1410 contained in the control plane VCN 1416 and to a data plane VCN 1418 (e.g., the data plane 1118 of FIG. 11) via an LPG 1410 contained in the data plane VCN 1418. The control plane VCN 1416 and the data plane VCN 1418 can be contained in a service tenancy 1419 (e.g., the service tenancy 1119 of FIG. 11).

The control plane VCN 1416 can include a control plane DMZ tier 1420 (e.g., the control plane DMZ tier 1120 of FIG. 11) that can include LB subnet(s) 1422 (e.g., LB subnet(s) 1122 of FIG. 11), a control plane app tier 1424 (e.g., the control plane app tier 1124 of FIG. 11) that can include app subnet(s) 1426 (e.g., app subnet(s) 1126 of FIG. 11), a control plane data tier 1428 (e.g., the control plane data tier 1128 of FIG. 11) that can include DB subnet(s) 1430 (e.g., DB subnet(s) 1330 of FIG. 13). The LB subnet(s) 1422 contained in the control plane DMZ tier 1420 can be communicatively coupled to the app subnet(s) 1426 contained in the control plane app tier 1424 and to an Internet gateway 1434 (e.g., the Internet gateway 1134 of FIG. 11) that can be contained in the control plane VCN 1416, and the app subnet(s) 1426 can be communicatively coupled to the DB subnet(s) 1430 contained in the control plane data tier 1428 and to a service gateway 1436 (e.g., the service gateway of FIG. 11) and a network address translation (NAT) gateway 1438 (e.g., the NAT gateway 1138 of FIG. 11). The control plane VCN 1416 can include the service gateway 1436 and the NAT gateway 1438.

The data plane VCN 1418 can include a data plane app tier 1446 (e.g., the data plane app tier 1146 of FIG. 11), a data plane DMZ tier 1448 (e.g., the data plane DMZ tier 1148 of FIG. 11), and a data plane data tier 1450 (e.g., the data plane data tier 1150 of FIG. 11). The data plane DMZ tier 1448 can include LB subnet(s) 1422 that can be communicatively coupled to trusted app subnet(s) 1460 (e.g., trusted app subnet(s) 1360 of FIG. 13) and untrusted app subnet(s) 1462 (e.g., untrusted app subnet(s) 1362 of FIG. 13) of the data plane app tier 1446 and the Internet gateway 1434 contained in the data plane VCN 1418. The trusted app subnet(s) 1460 can be communicatively coupled to the service gateway 1436 contained in the data plane VCN 1418, the NAT gateway 1438 contained in the data plane VCN 1418, and DB subnet(s) 1430 contained in the data plane data tier 1450. The untrusted app subnet(s) 1462 can be communicatively coupled to the service gateway 1436 contained in the data plane VCN 1418 and DB subnet(s) 1430 contained in the data plane data tier 1450. The data plane data tier 1450 can include DB subnet(s) 1430 that can be communicatively coupled to the service gateway 1436 contained in the data plane VCN 1418.

The untrusted app subnet(s) 1462 can include primary VNICs 1464(1)-(N) that can be communicatively coupled to tenant virtual machines (VMs) 1466(1)-(N) residing within the untrusted app subnet(s) 1462. Each tenant VM 1466(1)-(N) can run code in a respective container 1467(1)-(N), and be communicatively coupled to an app subnet 1426 that can be contained in a data plane app tier 1446 that can be contained in a container egress VCN 1468. Respective secondary VNICs 1472(1)-(N) can facilitate communication between the untrusted app subnet(s) 1462 contained in the data plane VCN 1418 and the app subnet contained in the container egress VCN 1468. The container egress VCN can include a NAT gateway 1438 that can be communicatively coupled to public Internet 1454 (e.g., public Internet 1154 of FIG. 11).

The Internet gateway 1434 contained in the control plane VCN 1416 and contained in the data plane VCN 1418 can be communicatively coupled to a metadata management service 1452 (e.g., the metadata management system 1152 of FIG. 11) that can be communicatively coupled to public Internet 1454. Public Internet 1454 can be communicatively coupled to the NAT gateway 1438 contained in the control plane VCN 1416 and contained in the data plane VCN 1418. The service gateway 1436 contained in the control plane VCN 1416 and contained in the data plane VCN 1418 can be communicatively couple to cloud services 1456.

In some examples, the pattern illustrated by the architecture of block diagram 1400 of FIG. 14 may be considered an exception to the pattern illustrated by the architecture of block diagram 1300 of FIG. 13 and may be desirable for a customer of the IaaS provider if the IaaS provider cannot directly communicate with the customer (e.g., a disconnected region). The respective containers 1467(1)-(N) that are contained in the VMs 1466(1)-(N) for each customer can be accessed in real-time by the customer. The containers 1467(1)-(N) may be configured to make calls to respective secondary VNICs 1472(1)-(N) contained in app subnet(s) 1426 of the data plane app tier 1446 that can be contained in the container egress VCN 1468. The secondary VNICs 1472(1)-(N) can transmit the calls to the NAT gateway 1438 that may transmit the calls to public Internet 1454. In this example, the containers 1467(1)-(N) that can be accessed in real-time by the customer can be isolated from the control plane VCN 1416 and can be isolated from other entities contained in the data plane VCN 1418. The containers 1467(1)-(N) may also be isolated from resources from other customers.

In other examples, the customer can use the containers 1467(1)-(N) to call cloud services 1456. In this example, the customer may run code in the containers 1467(1)-(N) that requests a service from cloud services 1456. The containers 1467(1)-(N) can transmit this request to the secondary VNICs 1472(1)-(N) that can transmit the request to the NAT gateway that can transmit the request to public Internet 1454. Public Internet 1454 can transmit the request to LB subnet(s) 1422 contained in the control plane VCN 1416 via the Internet gateway 1434. In response to determining the request is valid, the LB subnet(s) can transmit the request to app subnet(s) 1426 that can transmit the request to cloud services 1456 via the service gateway 1436.

It should be appreciated that IaaS architectures 1100, 1200, 1300, 1400 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 15:
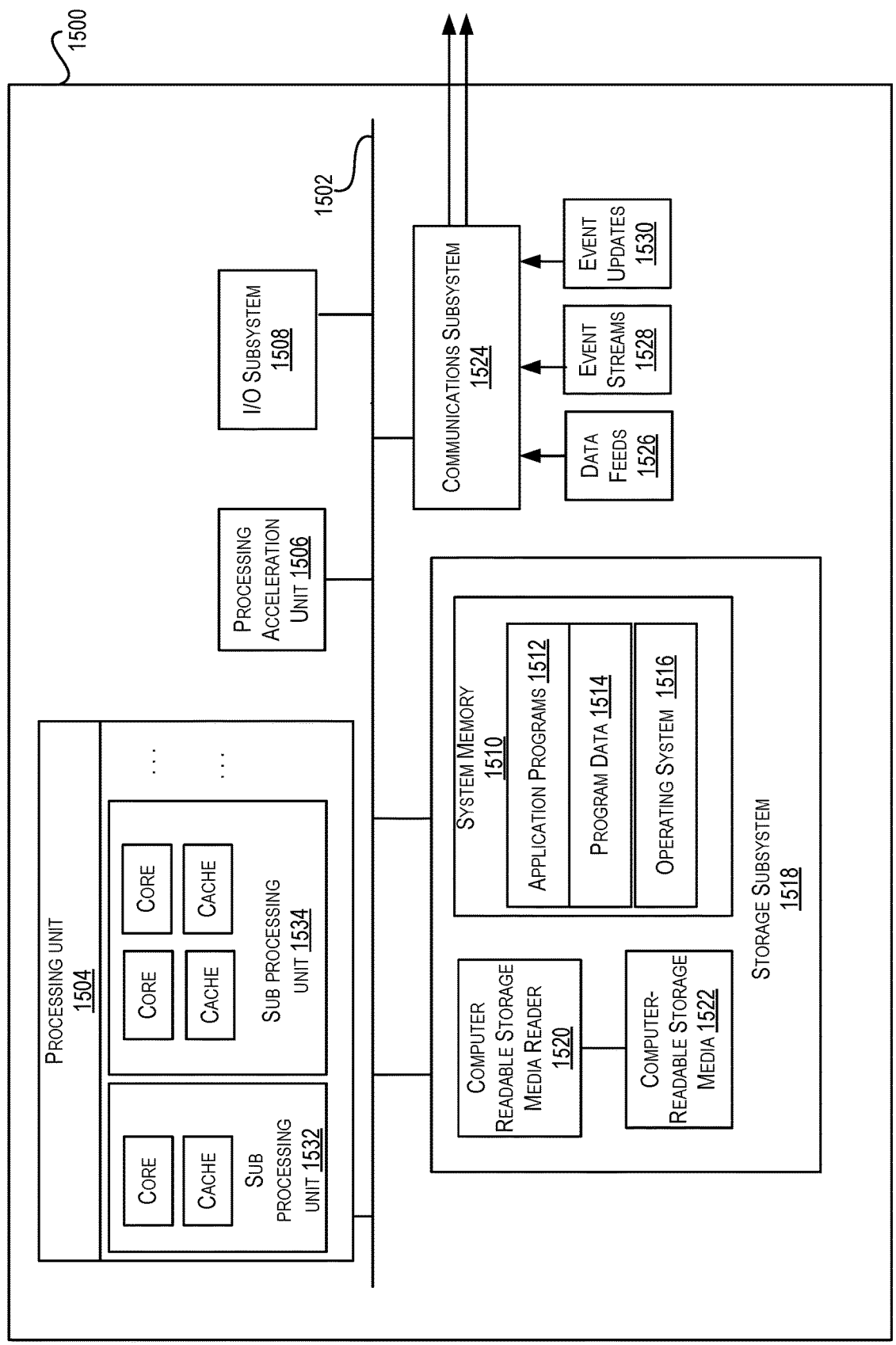
FIG. 15 is a block diagram illustrating an example computer system, according to at least one embodiment.

FIG. 15 illustrates an example computer system 1500, in which various embodiments may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that provides a tangible non-transitory computer-readable storage medium for storing software and data constructs that provide the functionality of the embodiments described in this disclosure. The software can include programs, code, instructions, scripts, etc., that when executed by one or more cores or processors of processing unit 1504 provide the functionality described above. Storage subsystem 1518 may also provide a repository for storing data used in accordance with the present disclosure.

As depicted in the example in FIG. 15, storage subsystem 1518 can include various components including a system memory 1510, computer-readable storage media 1522, and a computer readable storage media reader 1520. System memory 1510 may store program instructions that are loadable and executable by processing unit 1504. System memory 1510 may also store data that is used during the execution of the instructions and/or data that is generated during the execution of the program instructions. Various different kinds of programs may be loaded into system memory 1510 including but not limited to client applications, Web browsers, mid-tier applications, relational database management systems (RDBMS), virtual machines, containers, etc.

System memory 1510 may also store an operating system 1516. Examples of operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1500 executes one or more virtual machines, the virtual machines along with their guest operating systems (GOSs) may be loaded into system memory 1510 and executed by one or more processors or cores of processing unit 1504.

System memory 1510 can come in different configurations depending upon the type of computer system 1500. For example, system memory 1510 may be volatile memory (such as random access memory (RAM)) and/or non-volatile memory (such as read-only memory (ROM), flash memory, etc.). Different types of RAM configurations may be provided including a static random access memory (SRAM), a dynamic random access memory (DRAM), and others. In some implementations, system memory 1510 may include a basic input/output system (BIOS) containing basic routines that help to transfer information between elements within computer system 1500, such as during start-up.

Computer-readable storage media 1522 may represent remote, local, fixed, and/or removable storage devices plus storage media for temporarily and/or more permanently containing, storing, computer-readable information for use by computer system 1500 including instructions executable by processing unit 1504 of computer system 1500.

Computer-readable storage media 1522 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1500.

Machine-readable instructions executable by one or more processors or cores of processing unit 1504 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof)), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
   associating, by an edge device cloud service, a first cloud-computing edge device with a fleet of cloud-computing edge devices by at least obtaining a first public encryption key of the first cloud-computing edge device, the fleet characterized by a master encryption key and public encryption keys obtained from the cloud-computing edge devices;
   provisioning, by the edge device cloud service, the first cloud-computing edge device with the master encryption key, the master encryption key stored in a first key store of the first cloud-computing edge device;
   associating, by the edge device cloud service, a second cloud-computing edge device with the fleet by at least obtaining a second public encryption key of the second cloud-computing edge device;
   provisioning, by the edge device cloud service, the second cloud-computing edge device with the master encryption key and the first public encryption key, the master encryption key and the first public encryption key stored in a second key store of the second cloud-computing edge device;
   receiving, by the first cloud-computing edge device from the second cloud-computing edge device, encrypted message data comprising the second public encryption key, the encrypted message data generated by the second cloud-computing edge device using the master encryption key;
   decrypting, by the first cloud-computing edge device using the master encryption key stored in the first key store, the encrypted message data;
   updating, by the first cloud-computing edge device, the first key store with the second public encryption key; and receiving, by the first cloud-computing edge device, a request for a session token from the second cloud-computing edge device, the request comprising a signature generated using a second private encryption key corresponding to the second public encryption key;

verifying, by the first cloud-computing edge device using the second public encryption key stored in the first key store, the signature; and sending, by the first cloud-computing edge device based at least in part on a successful verification of the signature, the session token to the second cloud-computing edge device.

2. The computer-implemented method of claim 1, further comprising:

associating, by the edge device cloud service, a third cloud-computing edge device with the fleet by at least obtaining a third public encryption key of the third cloud-computing edge device; and provisioning, by the edge device cloud service, the third cloud-computing edge device with the master encryption key, the first public encryption key, and the second public encryption key.

3. The computer-implemented method of claim 1, wherein the encrypted message data further comprises a network address corresponding to the second cloud-computing edge device, and further comprising validating the request by at least comparing the network address received in the encrypted message data with a network address of the second cloud-computing edge device.

4. The computer-implemented method of claim 1, further comprising:

sending, by the first cloud-computing edge device, an application programming interface (API) request to the second cloud-computing edge device, the API request comprising the session token; and receiving, by the first cloud-computing edge device, an indication from the second cloud-computing edge device that the API request was successfully completed, the indication generated based at least in part on a successful validation of the session token.

5. The computer-implemented method of claim 1, further comprising:

receiving, by the first cloud-computing edge device, additional encrypted message data from the second cloud-computing edge device, the additional encrypted message data comprising an updated public encryption key and encrypted using the master encryption key, the updated public encryption key generated by the second cloud-computing edge device; and updating, by the first cloud-computing edge device, the first key store with the updated public encryption key.

6. The computer-implemented method of claim 1, further comprising:

provisioning, by the edge device cloud service, the first cloud-computing edge device with a fleet policy specifying a plurality of allowable actions for the fleet of cloud-computing edge devices; and receiving, by the first cloud-computing edge device, a request from the second cloud-computing edge device usable to perform an action; and performing, by the first cloud-computing edge device and based at least in part on a determination that the action corresponding to the request is one of the allowable actions, the action in response to the request.

7. A distributed computing system, comprising:
one or more processors; and
one or more memories storing computer-executable instructions that, when executed by the one or more processors, cause the distributed computing system to:

associate, by an edge device cloud service, a first cloud-computing edge device with a fleet of cloud-computing edge devices by at least obtaining a first public encryption key of the first cloud-computing edge device, the fleet characterized by a master encryption key and public encryption keys obtained from the cloud-computing edge devices;

provision, by the edge device cloud service, the first cloud-computing edge device with the master encryption key, the master encryption key stored in a first key store of the first cloud-computing edge device;

associate, by the edge device cloud service, a second cloud-computing edge device with the fleet by at least obtaining a second public encryption key of the second cloud-computing edge device;

provision, by the edge device cloud service, the second cloud-computing edge device with the master encryption key and the first public encryption key, the master encryption key and the first public encryption key stored in a second key store of the second cloud-computing edge device;

receive, by the first cloud-computing edge device from the second cloud-computing edge device, encrypted message data comprising the second public encryption key, the encrypted message data generated by the second cloud-computing edge device using the master encryption key;

decrypt, by the first cloud-computing edge device using the master encryption key stored in the first key store, the encrypted message data; and update, by the first cloud-computing edge device, the first key store with the second public encryption key; and receive, by the first cloud-computing edge device, a request for a session token from the second cloud-computing edge device, the request comprising a signature generated using a second private encryption key corresponding to the second public encryption key;

verify, by the first cloud-computing edge device using the second public encryption key stored in the first key store, the signature; and send, by the first cloud-computing edge device based at least in part on a successful verification of the signature, the session token to the second cloud-computing edge device.

8. The distributed computing system of claim 7, wherein the one or more memories store further instructions that, when executed by the one or more processors, cause the distributed computing system to further:

associate, by the edge device cloud service, a third cloud-computing edge device with the fleet by at least obtaining a third public encryption key of the third cloud-computing edge device; and provision, by the edge device cloud service, the third cloud-computing edge device with the master encryption key, the first public encryption key, and the second public encryption key.

9. The distributed computing system of claim 7, wherein the encrypted message data further comprises a network address corresponding to the second cloud-computing edge device, and wherein the one or more memories store further instructions that, when executed by the one or more processors, cause the distributed computing system to further validate the request by at least comparing the network address received in the encrypted message data with a network address of the second cloud-computing edge device.

10. The distributed computing system of claim 7, wherein the one or more memories store further instructions that, when executed by the one or more processors, cause the distributed computing system to further:
   send, by the first cloud-computing edge device, an application programming interface (API) request to the second cloud-computing edge device, the API request comprising the session token; and
   receive, by the first cloud-computing edge device, an indication from the second cloud-computing edge device that the API request was successfully completed, the indication generated based at least in part on a successful validation of the session token.

11. The distributed computing system of claim 7, wherein the one or more memories store further instructions that, when executed by the one or more processors, cause the distributed computing system to further:
   receive, by the first cloud-computing edge device, additional encrypted message data from the second cloud-computing edge device, the additional encrypted message data comprising an updated public encryption key and encrypted using the master encryption key, the updated public encryption key generated by the second cloud-computing edge device; and
   update, by the first cloud-computing edge device, the first key store with the updated public encryption key.

12. The distributed computing system of claim 7, wherein the one or more memories store further instructions that, when executed by the one or more processors, cause the distributed computing system to further:
   provision, by the edge device cloud service, the first cloud-computing edge device with a fleet policy specifying a plurality of allowable actions for the fleet of cloud-computing edge devices; and
   receive, by the first cloud-computing edge device, a request from the second cloud- computing edge device usable to perform an action; and
   perform, by the first cloud-computing edge device and based at least in part on a determination that the action corresponding to the request is one of the allowable actions, the action in response to the request.

13. A non-transitory computer-readable medium comprising executable instructions that, when executed by one or more processors of a distributed computing system, cause the distributed computing system to:
   associate, by an edge device cloud service, a first cloud-computing edge device with a fleet of cloud-computing edge devices by at least obtaining a first public encryption key of the first cloud-computing edge device, the fleet characterized by a master encryption key and public encryption keys obtained from the cloud-computing edge devices;
   provision, by the edge device cloud service, the first cloud-computing edge device with the master encryption key, the master encryption key stored in a first key store of the first cloud-computing edge device;
   associate, by the edge device cloud service, a second cloud-computing edge device with the fleet by at least obtaining a second public encryption key of the second cloud-computing edge device;
   provision, by the edge device cloud service, the second cloud-computing edge device with the master encryption key and the first public encryption key, the master encryption key and the first public encryption key stored in a second key store of the second cloud-computing edge device;
   receive, by the first cloud-computing edge device from the second cloud-computing edge device, encrypted message data comprising the second public encryption key, the encrypted message data generated by the second cloud-computing edge device using the master encryption key;
   decrypt, by the first cloud-computing edge device using the master encryption key stored in the first key store, the encrypted message data; and
   update, by the first cloud-computing edge device, the first key store with the second public encryption key; and
   receive, by the first cloud-computing edge device, a request for a session token from the second cloud-computing edge device, the request comprising a signature generated using a second private encryption key corresponding to the second public encryption key;
   verify, by the first cloud-computing edge device using the second public encryption key stored in the first key store, the signature; and
   send, by the first cloud-computing edge device based at least in part on a successful verification of the signature, the session token to the second cloud-computing edge device.

14. The non-transitory computer-readable medium of claim 13, comprising additional instructions that, when executed by the one or more processors, cause the distributed computing system to further:
   associate, by the edge device cloud service, a third cloud-computing edge device with the fleet by at least obtaining a third public encryption key of the third cloud-computing edge device; and
   provision, by the edge device cloud service, the third cloud-computing edge device with the master encryption key, the first public encryption key, and the second public encryption key.

15. The non-transitory computer-readable medium of claim 13, wherein the encrypted message data further comprises a network address corresponding to the second cloud-computing edge device, and comprising additional instructions that, when executed by the one or more processors, cause the distributed computing system to further validate the request by at least comparing the network address received in the encrypted message data with a network address of the second cloud-computing edge device.

16. The non-transitory computer-readable medium of claim 13, comprising additional instructions that, when executed by the one or more processors, cause the distributed computing system to further:
   send, by the first cloud-computing edge device, an application programming interface (API) request to the second cloud-computing edge device, the API request comprising the session token; and
   receive, by the first cloud-computing edge device, an indication from the second cloud-computing edge device that the API request was successfully completed, the indication generated based at least in part on a successful validation of the session token.

17. The non-transitory computer-readable medium of claim 13, comprising additional instructions that, when executed by the one or more processors, cause the distributed computing system to further:
   receive, by the first cloud-computing edge device, additional encrypted message data from the second cloud-computing edge device, the additional encrypted message data comprising an updated public encryption key and encrypted using the master encryption key, the updated public encryption key generated by the second cloud-computing edge device; and update, by the first cloud-computing edge device, the first key store with the updated public encryption key.

18. The computer-implemented method of claim 1, wherein the encrypted message data further comprises a network address corresponding to the second cloud-computing edge device, and further comprising associating the network address with a trusted device in the fleet of cloud computing edge devices.

19. The distributed computing system of claim 7, wherein the encrypted message data further comprises a network address corresponding to the second cloud-computing edge device, and wherein the one or more memories store further instructions that, when executed by the one or more processors, cause the distributed computing system to further associate the network address with a trusted device in the distributed computing system.

20. The non-transitory computer-readable medium of claim 13, wherein the encrypted message data further comprises a network address corresponding to the second cloud-computing edge device, and further comprising additional instructions that, when executed by the one or more processors, cause the distributed computing system to further associate the network address with a trusted device in the distributed computing system.

\* \* \* \* \*